United States Patent [19]
Hayashi et al.

[11] Patent Number: 5,857,195
[45] Date of Patent: Jan. 5, 1999

[54] METHOD OF DEVELOPING AND MODIFYING SELF-DESCRIBING DATABASE MANAGEMENT SYSTEM TO GENERATE A NEW DATABASE MANAGEMENT SYSTEM FROM AN EXISTING DATABASE MANAGEMENT SYSTEM

[75] Inventors: Katsumi Hayashi, Mishima; Kazuhiko Saitou, Numazu; Hiroshi Ohsato, Numazu; Masaaki Mitani, Numazu; Tomohiro Hayashi; Takashi Obata, both of Mishima; Yutaka Sekine, Numazu; Mitsuhiro Ura, Suntou-gun; Takuji Ishii, Numazu, all of Japan

[73] Assignee: Fujitsu Limited, Kanagawa, Japan

[21] Appl. No.: 655,311

[22] Filed: May 21, 1996

Related U.S. Application Data

[63] Continuation of Ser. No. 295,148, Aug. 24, 1994, abandoned, which is a continuation of Ser. No. 745,491, Aug. 14, 1991, abandoned.

[30] Foreign Application Priority Data

Aug. 31, 1990 [JP] Japan ..................................... 2-231447

[51] Int. Cl.⁶ ..................................................... G06F 7/00
[52] U.S. Cl. ........................................... 707/102; 707/203
[58] Field of Search ..................................... 395/613, 700, 395/619; 707/102, 203

[56] References Cited

U.S. PATENT DOCUMENTS

| | | | |
|---|---|---|---|
| 4,205,371 | 5/1980 | Feather | 395/600 |
| 4,734,854 | 3/1988 | Afshar | 395/700 |
| 4,774,661 | 9/1988 | Kumpati | 364/300 |
| 4,791,561 | 12/1988 | Huber | 364/300 |
| 4,819,160 | 4/1989 | Tanka et al. | 364/300 |
| 4,908,759 | 3/1990 | Alexander, Jr. et al. | 364/300 |
| 4,931,928 | 6/1990 | Greenfeld | 395/600 |
| 5,133,063 | 7/1992 | Naito et al. | 395/500 |
| 5,159,687 | 10/1992 | Richburg | 395/700 |
| 5,185,887 | 2/1993 | Takahashi et al. | 395/922 |
| 5,230,049 | 7/1993 | Chang et al. | 395/700 |
| 5,235,701 | 8/1993 | Ohler et al. | 395/600 |
| 5,375,237 | 12/1994 | Tanaka et al. | 395/650 |

OTHER PUBLICATIONS

Patel, K. Bhadra, Automated Tool For Database Design and Criteria For Their Selection For Aerospace Applications, Aerospace Applications, 1989 Conf. pp. 1–13.

Parsaye, Kamran et al., *Intelligent Databases*, John Wiley & Sons, Inc., pp. 35–83, 161–222 1989 Cover, Preface, Table of Content, 449–468.

*FoxBase+* User Manual (Revision 2.00), Fox Software, Inc. Jul. 1987. pp. 2–14, 2–15, Cover.

*Primary Examiner*—Lucien U. Toplu
*Attorney, Agent, or Firm*—Staas & Halsey

[57] ABSTRACT

A method of developing a self-describing database management system comprises the steps of holding definition data of a database management system to be developed as data on a database and creating a database management system to be developed by the use of an existing database management system. The database management system to be developed comprises a data definition processing execution program and a bind processing execution program. These two programs include a process to permit access to definition data which form database, and are executed based on the definition data on the database.

2 Claims, 30 Drawing Sheets

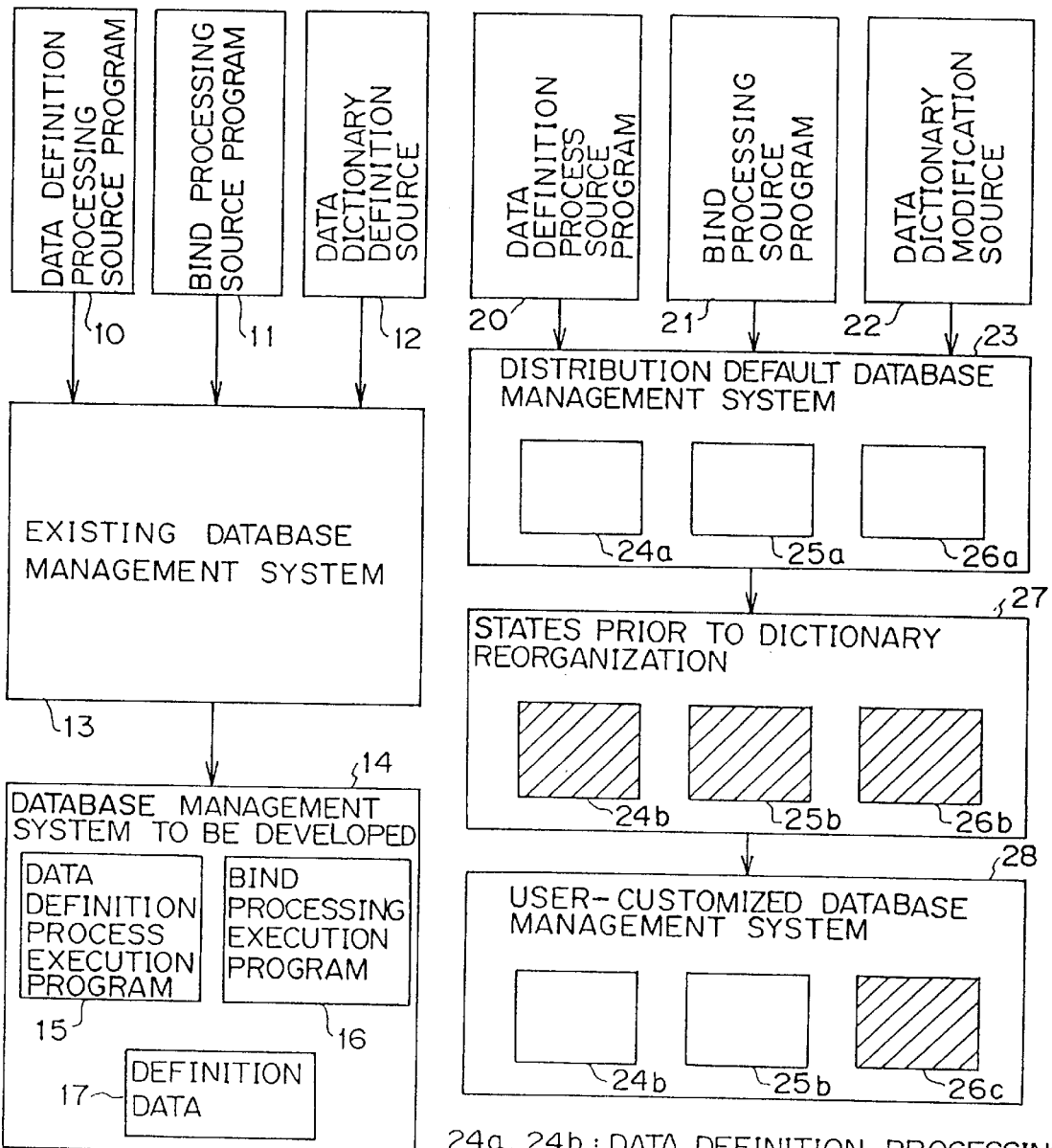

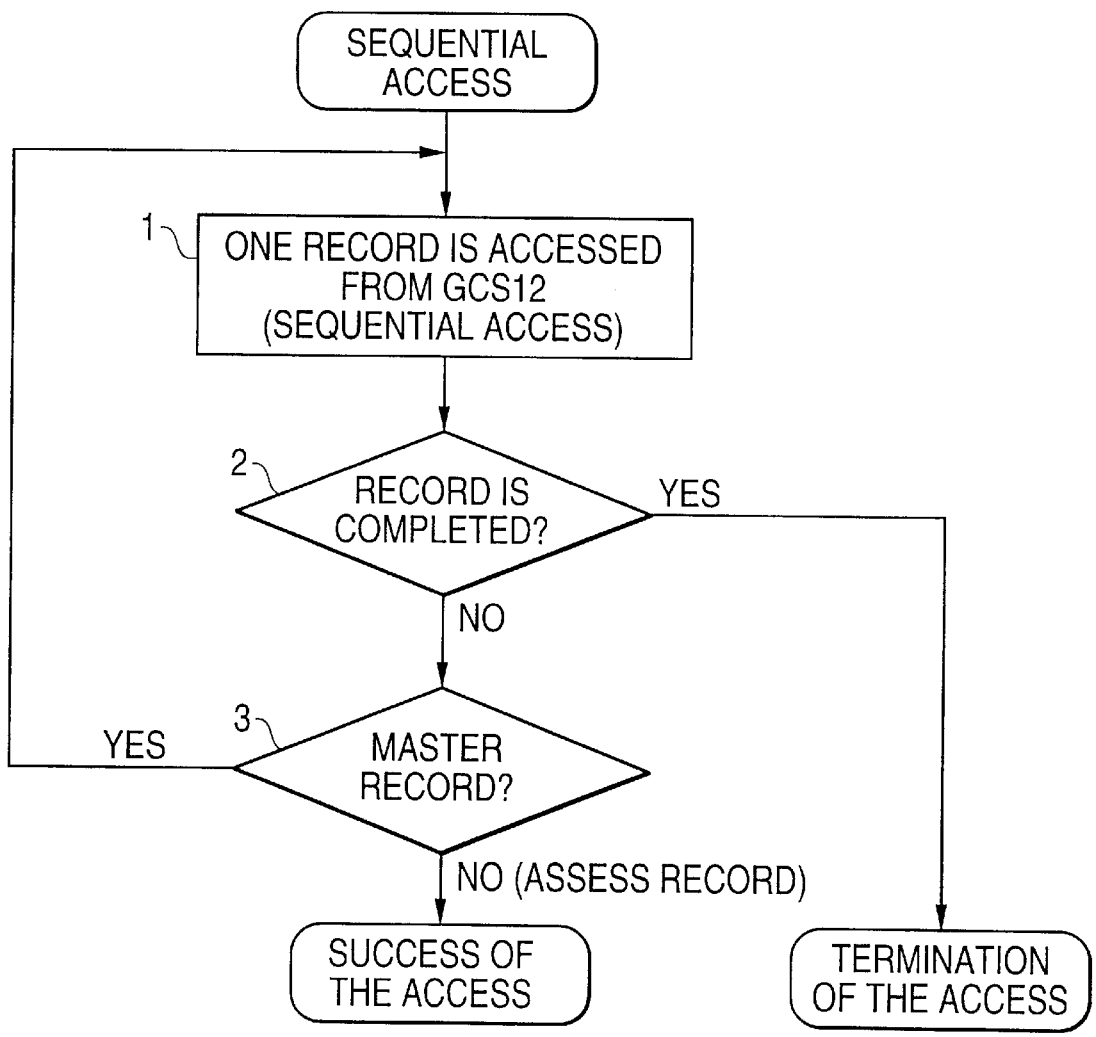

[CUSTOMER MANAGEMENT TABLE]

| CUSTOMER CODE | CUSTOMER ATTRIBUTE |
|---|---|
| CUSTOMER -1 | CUSTOMER ATTRIBUTE-A |
| CUSTOMER -2 | CUSTOMER ATTRIBUTE-B |
| CUSTOMER -3 | CUSTOMER ATTRIBUTE-C |
| CUSTOMER -4 | CUSTOMER ATTRIBUTE-D |
| CUSTOMER -5 | CUSTOMER ATTRIBUTE-E |
| ⋮ | ⋮ |
| CUSTOMER - n | CUSTOMER ATTRIBUTE-F |

Fig. 9A

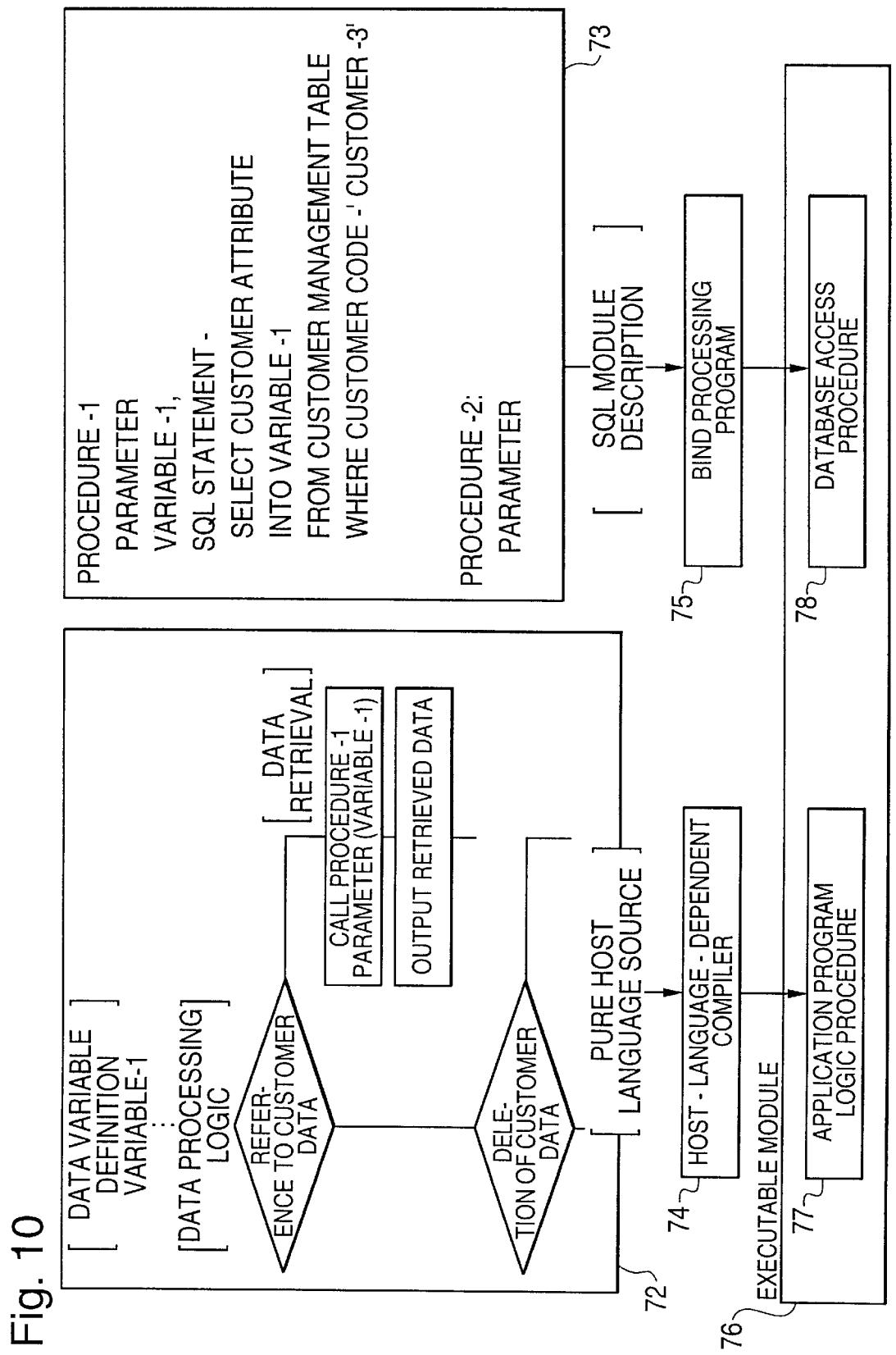

Fig. 13A [TABLE - ATTRIBUTE TABLE]

| TABLE NAME | TABLE ATTRIBUTE |
|---|---|
| CUSTOMER MANAGEMENT TABLE | BASE TABLE |

Fig. 13B [COLUMN - ATTRIBUTE TABLE]

| TABLE NAME | COLUMN NAME | ATTRIBUTE |
|---|---|---|
| CUSTOMER MANAGEMENT TABLE | CUSTOMER CODE | |
| CUSTOMER MANAGEMENT TABLE | CUSTOMER ATTRIBUTE | |

Fig. 13C [STORAGE - ATTRIBUTE TABLE]

| STORAGE AREA NAME | STORAGE ATTRIBUTE | TABLE NAME |
|---|---|---|
| STORAGE -1 | HASH STRUCTURE | CUSTOMER MANAGEMENT TABLE |

Fig. 13D [STORAGE - KEY ATTRIBUTE TABLE]

| STORAGE AREA NAME | KEY TABLE NAME | KEY COLUMN NAME |
|---|---|---|
| STORAGE -1 | CUSTOMER MANAGEMENT TABLE | CUSTOMER CODE |

[DICTIONARY]

[DATA DEFINITION DESCRIPTION OF DEFAULT DICTIONARY STRUCTURE]

[BIND PROCESSING SQL MODULE DESCRIPTION]

[BIND PROCESSING PROGRAM]

[DATA DEFINITION PROCESSING SQL MODULE DESCRIPTION]

[DATA DEFINITION PROCESSING PROGRAM]

METHOD OF DEVELOPING AND MODIFYING SELF-DESCRIBING DATABASE MANAGEMENT SYSTEM TO GENERATE A NEW DATABASE MANAGEMENT SYSTEM FROM AN EXISTING DATABASE MANAGEMENT SYSTEM

This application is a continuation of application Ser. No. 08/295,148, filed Aug. 24, 1994, now abandoned, which is a continuation of application Ser. No. 07/745,491, filed Aug. 14, 1991, now abandoned.

BACKGROUND OF THE INVENTION

The present invention relates to a method of developing and modifying a self-describing database management system including a data definition process execution program for analyzing an input definition source and storing necessary information in a data dictionary, and a bind process execution program for binding an input SQL statement with a storage structure definition information to create an optimum processing procedures, i.e. an optimized processing program which can be written by the SQL statement.

DESCRIPTION OF THE RELATED ART

As demands for database management systems become complicated and high in level, burdens imposed on the development of database management systems have become heavy. It is thus desired to take measures against the problem. In addition, there is a desire for techniques which make it possible for a user to easily tailor the structure of system definition data defining a database management system to suit the user's requirements.

For example, a database management system which retrieves a database in response to an query in the SQL language (database language SQL JIS x 3005-1990) comprises a data definition process execution program for defining the logical structure or the storage structure of the database as an input, a bind process execution program for generating a database access procedure in response to a query, definition data which is used by the programs and so on.

A conventional database management system stores such database definition data in a special storage structure/storage facility which is set up distinct from the database. The database management system is thus required to set up special access processing for the storage structure independently of an access processing to a database created by the user.

On the other hand, the database definition data may greatly vary in quantity, depending on applications of installed database management systems. Requests for access to the database definition data may also vary, depending on the applications of the database management systems.

Originally it should be possible to select a suitable logical structure and storage structure to conform to such differences. However, since a special structure and a special program are set up to store the database definition data, it is actually almost impossible to change such a storage structure according to users.

SUMMARY OF THE INVENTION

An object of the present invention is to provide means for facilitating the development and modification of database management systems which have been improved functionally from year to year.

A feature of the present invention resides in a method of developing a self-describing database management system comprising the steps of holding definition data of a database management system to be developed as data on a database; and creating, by the use of an existing database management system a database management system to be developed, said database management system comprising a data definition processing execution program and a bind processing execution program which includes a process to permit access to definition data which define a database, and are executed on the database with reference to the definition data on the database.

BRIEF DESCRIPTION OF THE DRAWINGS

FIGS. 1A and 1B are dynamic block diagrams for use in explanation of the principle of the present invention;

FIGS. 2A to 2E respectively show are explanatory views of a concrete example regarding the present invention.

FIG. 9A is an explanatory view of a table;

FIGS. 9A, 9B and FIG. 10 are block diagrams with embedded flowcharts for use in explanation of a process of translating an application program in conjunction with FIG. 9A;

FIGS. 13A to 13D are explanatory views illustrating an example of a table for managing definition information;

DETAILED DESCRIPTION OF THE PREFERRED EMBODIMENT

Figure 2A:
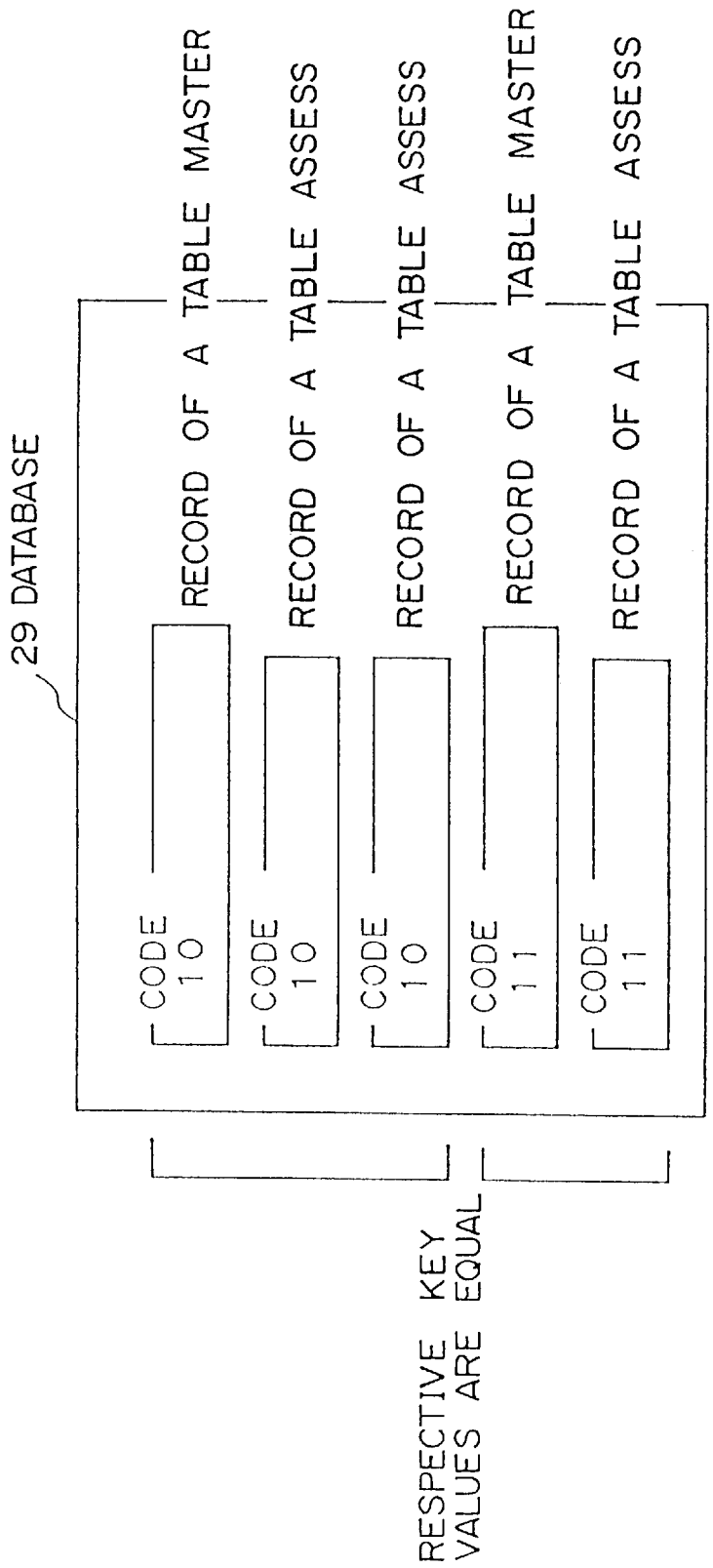

FIGS. 1A and 1B are diagrams illustrating the principle of the present invention.

With a self-describing database management system developing method according to the present invention, definition data 17 of a database management system 14 which is a candidate for development is held as data on a database as indicated in FIG. 1A. This is referred to as formation of database of the definition data. The database is called a data dictionary, which is distinguished from those created by general users. The management of a database management system itself by the use of a database is referred to as self-description.

A data definition processing source program 10 describes a data definition processing execution program 15 for creating a data definition statement as an input definition data for defining a logical structure or a storage structure of the database in the database management system 14 which is a candidate for development.

The data definition processing execution program is further explained as follows. The data definition comprises a logical definition, storage definition, and physical definition. In case of the logical definition, the following definition source is created.

CREATE TABLE Table Name-1

(Column Name-1 INTEGER,

Column Name-2 CHARACTER(10)).

The data definition processing execution program analyses the input definition source and stores the necessary information in the data dictionary. The data dictionary is also formed of RDB and comprises a table for managing the table name and a column table for managing the column.

The data definition processing program adds the data as follows, in case of the above table definition.

INSERT INTO Table TABLE VALUES ("Table Name-1", . . . );

INSERT INTO Column TABLE VALUES ("Column Name-1", . . . ) "Table Name-1",

INSERT INTO Column Table VALUES ("Column Name-2", "Table Name-1", . . . )

The storage structure structurally expresses how the imaginary logic structure is mapped on the records of the storage structure.

As the above table table, and column table are considered as the table, the table table and column table are also managed in the data dictionary. Therefore, the data dictionary manages a group of tables forming the dictionary.

A bind processing source program 11 describes a bind processing execution program 16 which creates a database access procedure for queries.

A data dictionary definition source 12 describes the definition data 17, which are used by the data definition processing execution program 15 and the bind processing execution program 16, as data on the database. That is, the data dictionary definition source 12 is referred to as definition data, when it is formed into a database.

The data dictionary definition source 12 creates, as the definition data 17, a logical data structure of the definition data 17 after definition thereof by using an existing database management system 13 having an SQL facility (for example, a facility defined by the database language SQL JIS x 3005-1990). The data definition processing source program 10, the bind processing source program 11, the data dictionary definition source 12 and the existing database management system 13 having the SQL facility generate the data definition processing execution program 15 and the bind processing execution program 16 which can make access to the definition data 17.

That is, the data definition and data access sections of the data definition processing source program 10, the bind processing source program 11 and the data dictionary definition source 12 are created by a language handled by the existing database management system 13, and the database management system 14 which is being developed is created on the basis of the data definition and data access sections.

With a method of modifying a self-describing database management system according to the present invention, as shown in FIG. 1B, a distribution default database management system 23 is used which is composed of a data definition processing execution program 24a, a bind processing execution program 25a and definition data 26a used by those programs, and the definition data 26a is modified to definition data 26b by the data definition processing execution program 24a on the basis of a data dictionary modification source 22. In order to enable access to the data structure defined by the definition data 26b, a new bind processing execution program 25b and a new data definition processing execution program 24b are generated by the bind processing execution program 25a on the basis of the bind process source program 21 and the data definition process source program 20. This is a state 27 prior to dictionary reorganization.

In this state 27 the modified definition data 26b after modification cannot be accessed by the bind process execution program 25b. Then, the definition data 26b is converted to definition data 26c by a process of reorganizing the dictionary to thereby produce a user-customized database management system 28. In this way, the user customizing is completed.

In the present invention, definition information on logical and storage of the database is stored in the database, and the database definition data is bound in an executable module by the bind process execution program upon an access request to the database. Thus, the database can be accessed without referring to the logical and storage information at the time of the execution of the executable module. Thereby, the logical and storage structures of the database which store the database definition information can be modified easily.

All the data structures submitted from the database management system can be employed for structures that manage the database definition information by forming the database from the database definition information.

The database access is realized by two phases: a phase (bind phase) in which an executable module is generated from the source program; and a phase (execution phase) in which the executable module is executed to make actual access to the database.

In the bind phase, a reference is made to the database definition information to generate an executable module. For this reference use is made of an executable module which accesses the database storing the database definition information.

The executable module makes access to the database by referring not to database definition information (logical structure information such as table name, column name, table configuration, column attribute, etc., and storage structure information such as record format, record organization, etc.) but to physical information (location of stored data area on external storage and its stored state). This facility makes it possible to easily modify the logical and storage structures of the database which stores the database definition information. In the case as well in which the data dictionary definition information describing the database management system is user-customized, no special consideration is needed and the efficiency of development is improved.

At first a concrete example relating to the present invention is explained below with reference to a multiple mapping in which a composite structure comprising records is mapped into a plurality of tables. The explanation of matters known from the related technology are omitted.

In a logical structure definition, a table is defined independently of a storage structure (a multiple mapping in this case). For example, a logical structure is defined by a logical structure definition statement written in the SQL language described below:

CREATE TABLE
    MASTER (—a personnel master table CODE,—an employee code column NAME,—an employee name column C11, C12, C13 C14, C15—other detailed information UNIQUE (CODE))
CREATE TABLE
    ASSESS (—a personnel survey table CODE,—an employee code column C21, C22, C23, C24, C25, —other detailed information FOREIGN KEY (CODE) REFERENCES MASTER (CODE))

In this definition, the employee code column of the personnel master table (MASTER) is assigned a unique value. A value in the employee code column (CODE) of the personnel survey table (ASSESS) should match the value of one of the employee code columns of the personnel master table. That is, the definition indicates that there are personnel survey data for actual employees only.

A generic composite structure defines how these tables are stored (a multiple mapping in this case).
CREATE GCS
    GCS12
    CLUSTERING
    FOR MASTER, ASSES
    KEYS MASTER (CODE)
    KEYS ASSESS (CODE)

This definition indicates that each record of a table MASTER and ASSESS is stored such that records having an equal key value are arranged physically closely (i.e. as a clustering storage).

This definition information is stored in a data dictionary as defined data by various definition functions.

FIG. 2A shows an example of the state of a database stored in accordance with such definition information.

FIG. 2A shows the state of one page in a composite structure CS in a database 29, wherein records having an equal key value (CODE) are stored adjacent to each other.

Figure 2B:
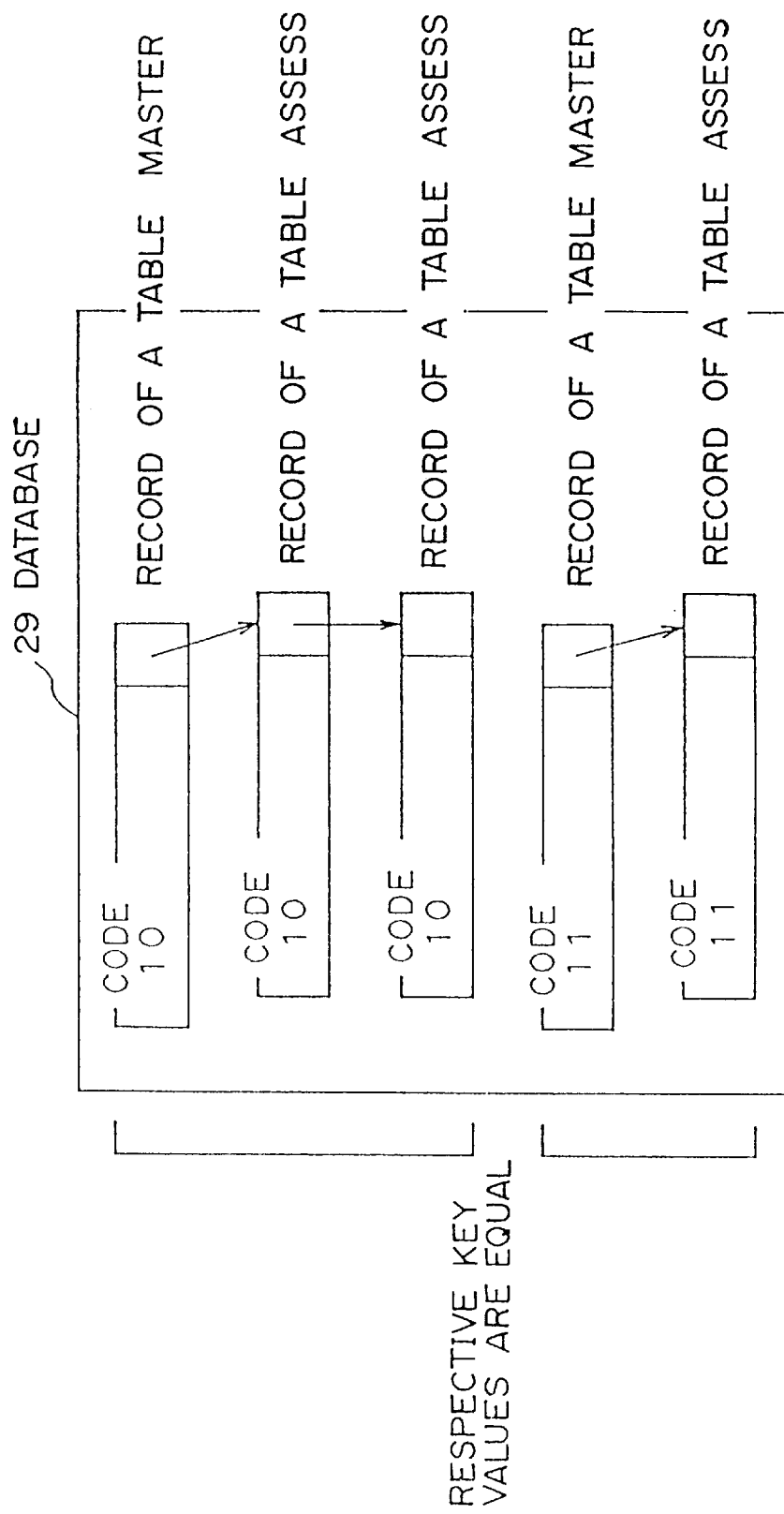

In storing a multiple mapping, list storage or combination storage can be selected in addition to clustering storage. List storage links related records with a pointer in a list form. FIG. 2B shows an example of list storage corresponding to the above described clustering.

Figure 2C:
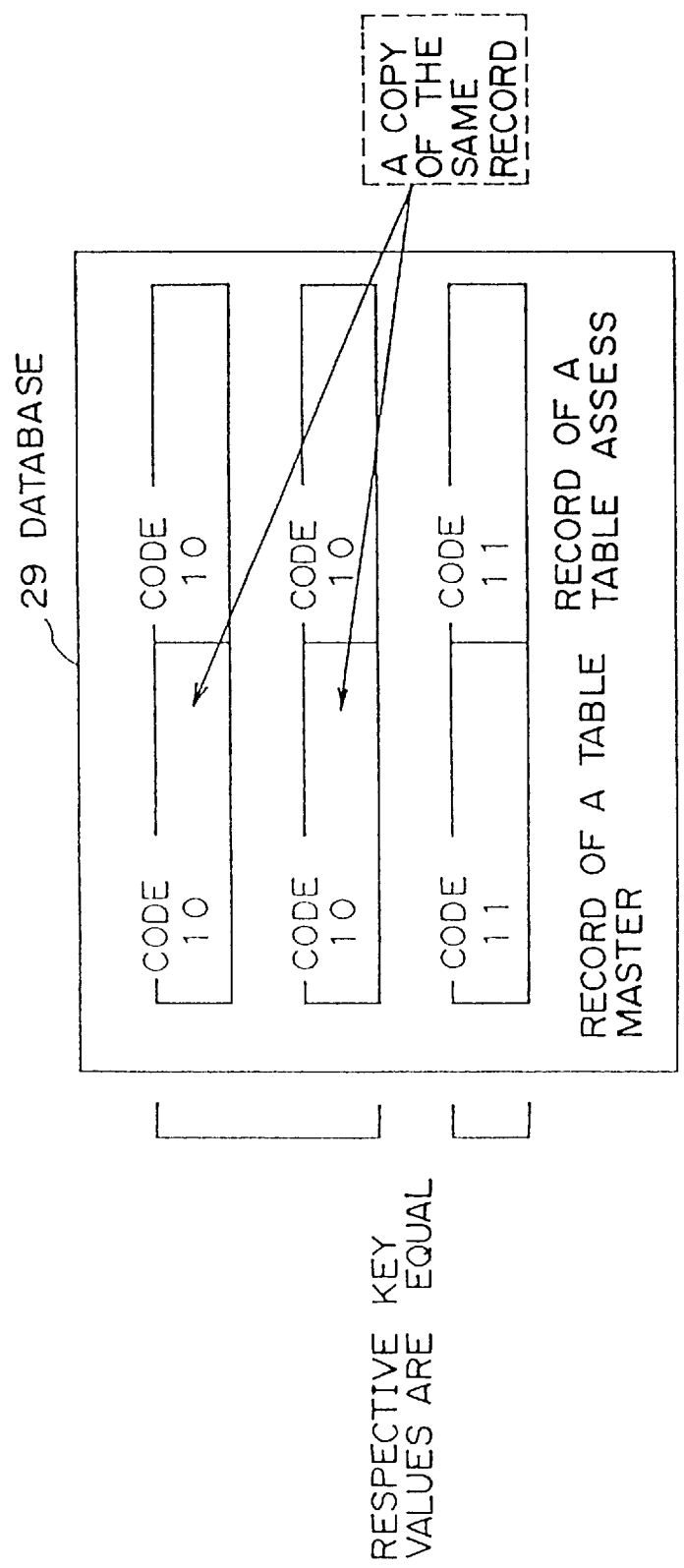

Combination storage refers to the storage after related records are combined into one record. When a column value, a combination key, is duplicately stored, a copy of the record may be made. FIG. 2C shows an example of combination storage corresponding to clustering.

As described above, there are a plurality of components to be selected in a storage of multiple mapping, and clustering storage of them is described below.

Suppose the following query requiring an optimizing process is received in association with the database.

```
SELECT C11, C12, C24, C32
FROM MASTER, ASSESS, T3
WHERE MASTER.CODE = ASSESS.CODE
AND MASTER.C13 = T3.C31
```

In the above query, a specified column value (C11, C12, C24, and C32) is obtained from a record having an equal value in each column (CODE respectively) in two tables and having an equal value in each column (C13 and C31) of another two tables.

In the optimizing process, the definition information in a data dictionary is accessed and MASTER and ASSESS are clustered. After confirming that the clustering key and the combination condition of the query match, the query is transformed to a transformation query as described below.

```
SELECT C11, C12, C24, C32
FROM GCS12, T3
WHERE C13 = C31
```

Queries to GCS12 and T3 generate a schedule using the technology of merge join and tapple-substitution join. (Reference)

"Decomposition—A Strategy for Query Processing"

EUGINE WONG AND KAREL YOUSSEFI

ACM TODS Vol.1, No.3, 1976.

Figure 2D:
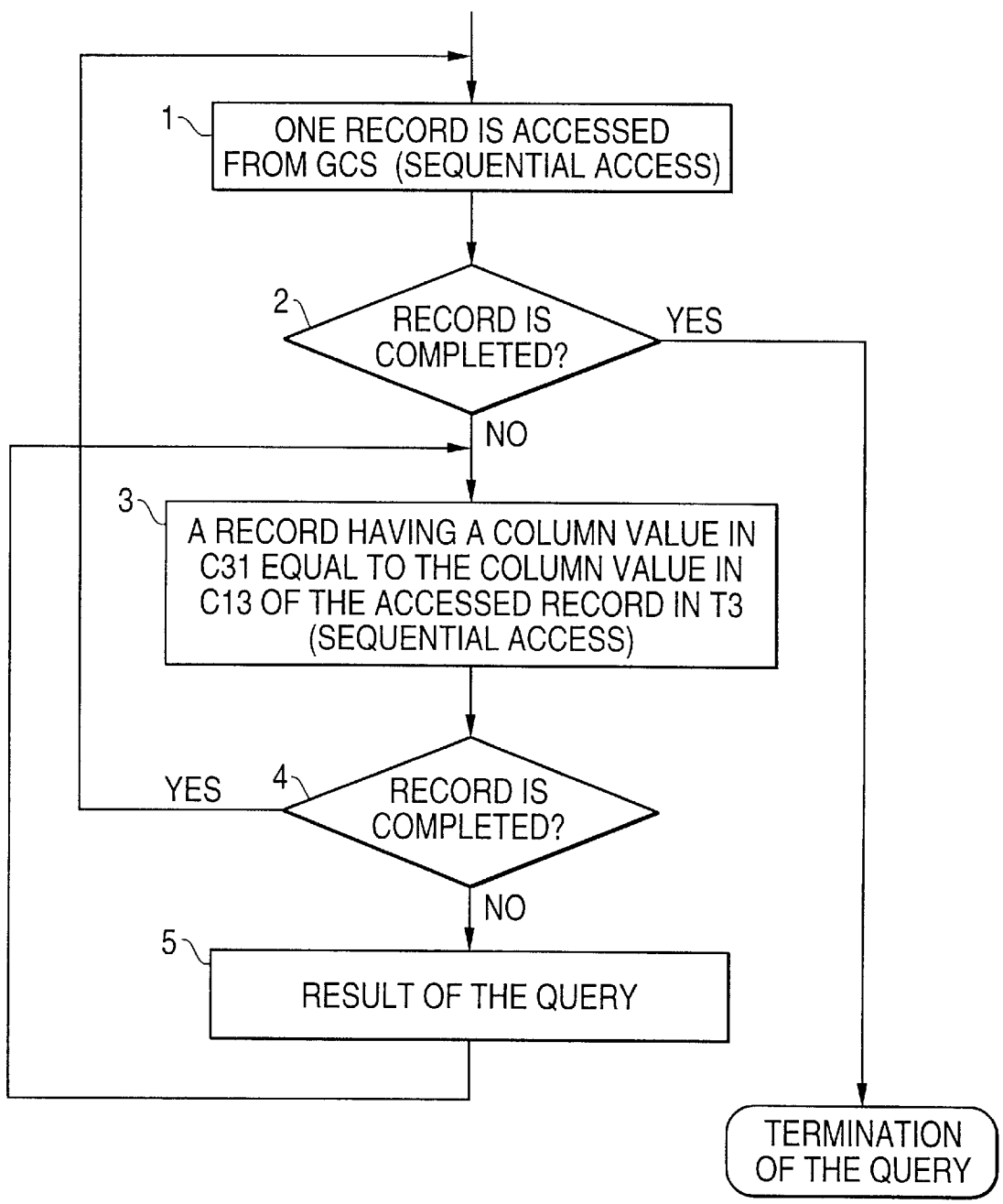

For example, in the technology of tapple-substitution join, the algorithm is scheduled as shown in FIG. 2D.

1 A record is read from a GCS. This is a sequential access.

2 When the record has been read, the query is terminated.

3 A record having a column value in C31 equal to the column value in C13 of the accessed record is accessed sequentially in T3.

4 Determination is made as to whether or not the process of the record in T3 is completed. If yes, the process is returned to step 1.

5 If no, step 3 is performed again.

Sequential access from GCS identifies a record type (a record of a MASTER table or a record of an ASSESS table) and controls the access order. For these processes, the fact that not more than one record in a MASTER table exists as mapping to GCS and that a record in an ASSESS table is accessed following a record in a MASTER table having an equal key.

FIG. 2E shows a schedule for sequentially accessing a record as a result of a join by a key value in a MASTER table and a ASSESS table from GCS12.

1 One record is accessed sequentially from GCS12.

2 When the process is completed, the access is terminated.

3 Determination is made as to whether or not the record is a MASTER record. If yes, the process is returned to step 1 and the next record is accessed. If it is an ASSESS record, the access is determined as being successful.

In the universe of data organization such as B+TREE (BTREE) and dynamic hash (DHASH), multiple mapping and simple mapping result in the same organization. A data organization can be selected independently the type of mapping process.

In multiple mapping in clustering storage, the only difference is that it has a table identifier in each record. This can be realized by providing a record with a special column for indicating an attributed table.

The above description relates to multiple mapping only. However, other types of mapping permit associating a logical structure with a generic composite structure, i.e., storage element.

In an optimizing processing for selecting an optimum processing procedure for the database, the definition source is logically defined by the SQL statement, the data definition processing execution program analyses the definition source, stores it in the data dictionary, and thereafter the bind processing execution program binds it with the storage structure definition information.

An embodiment of a method of developing and modifying self-description type database management system will be explained according to the present invention. First, as the development phase, a description will be made of the setup of a system table and the generation of a bind process execution program and a data definition process execution program with reference to FIGS. 3 to 4B. Next, as the distribution phase, a description will be made of the installation of a database management system, the modification of data dictionary definition information, the generation of an execution program for the modified data dictionary and the modification of the data dictionary structure with reference to FIGS. 5 to 8.

A. Development Phase

A. 1 Setup of System Table

Figure 3:
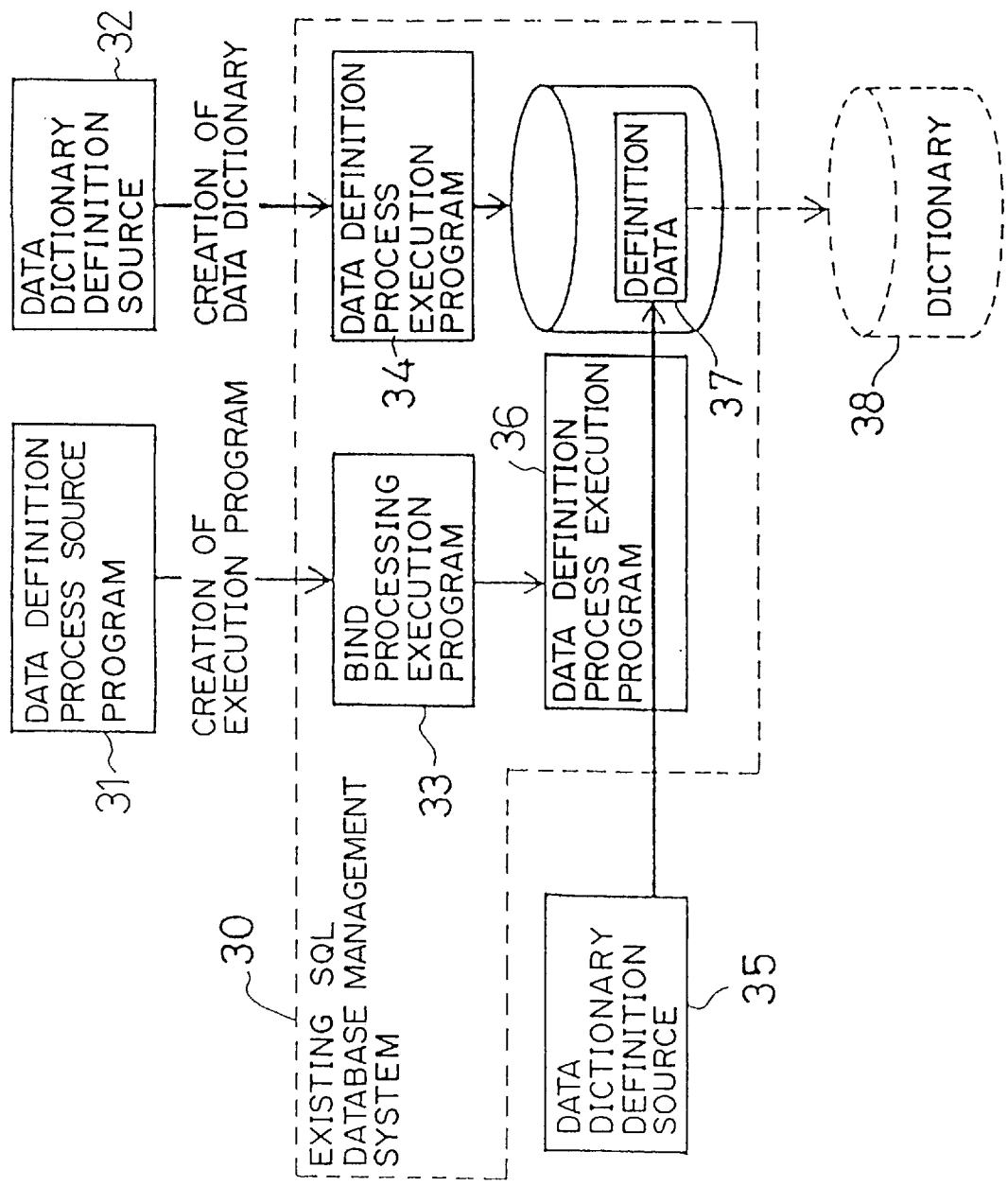
FIG. 3 is a block diagram for use in explanation of the setup of a system table according to an embodiment of the present invention.

Referring now to FIG. 3, there is shown a diagram illustrating the setup of a system table according to an embodiment of the present invention.

An existing SQL database management system 30 is employed as a store for data definition information. It is to be noted here that the existing SQL database management system 30 may be an old version or a database management system developed by another company and has an SQL facility defined by, for example, the database language SQL JIS x 3005-1990. A table needed as the store is defined on the database of the database management system by a data definition process execution program 34 with a data dictionary definition source 32 as an input.

The definition data 37, which defines the data dictionary structure of the database management system which is an object of a development, is obtained by converting a data dictionary definition source 35 defined by the data definition process execution program 36 to be developed to definition data, by means of the data definition process execution program 36.

The data definition process execution program 36 is an executable program which is obtained by converting the data definition process source program 31 which describes the storage of data into the data dictionary using SQL data operation statements by means of the bind process execution program 33.

The data dictionary definition source 32 is data definition statements which define a data structure as the store of the data definition information and which are defined by the existing SQL database management system 30. On the other hand, the data dictionary definition source 35 is data definition statements which define the data structure of the data dictionary for development and which are defined by the database management system to be developed.

A.2 Generation of Bind Process Execution Program

Figure 4A:
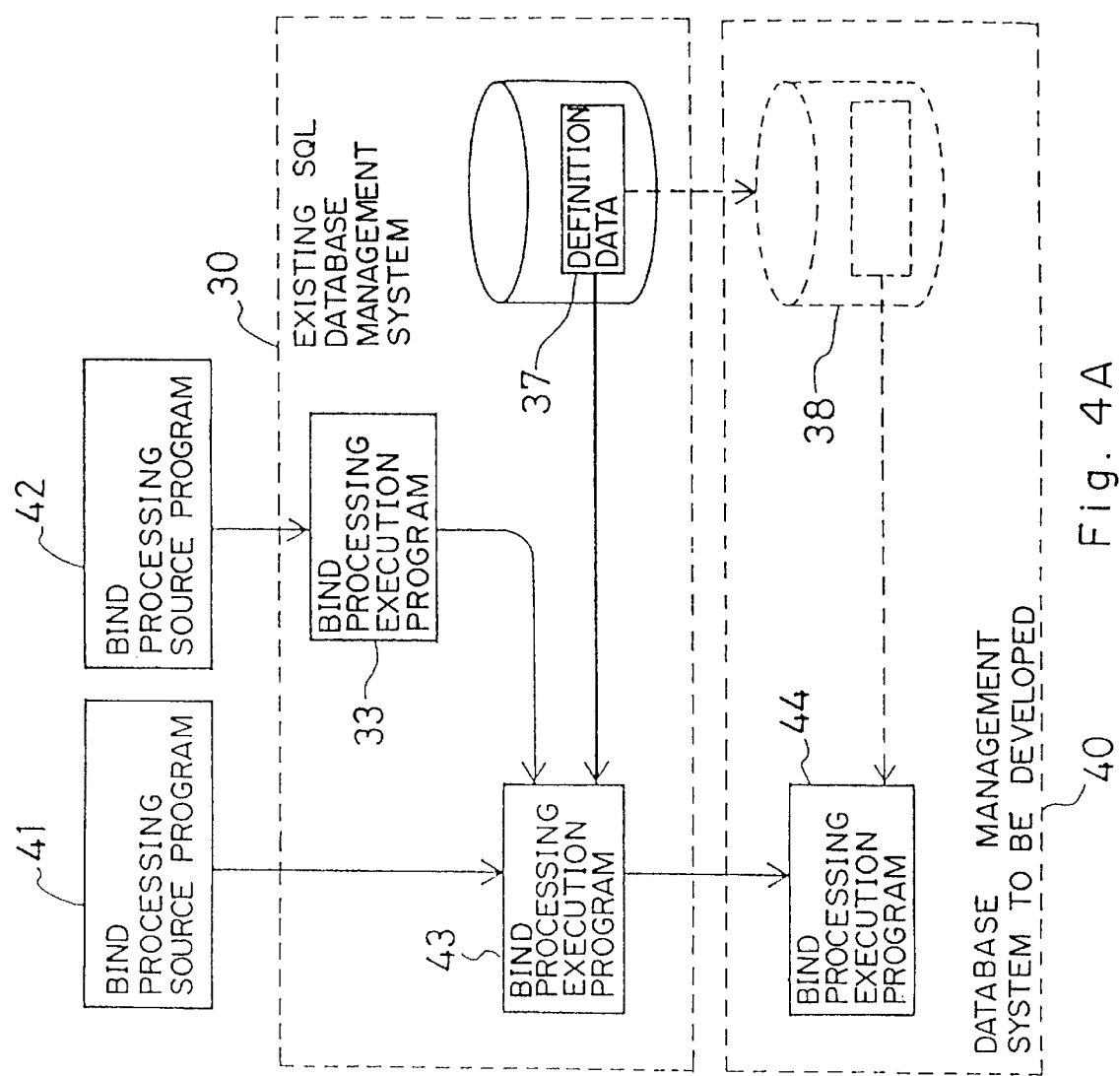
FIG. 4A is a block diagram for use in explanation of the generation of a bind process execution program according to an embodiment of the present invention.

FIG. 4A is a diagram illustrating the generation of the bind process execution program according to an embodiment of the present invention.

The bind process execution program generates an execution program for accessing the database with a bind process source program described by the use of the SQL operation statements as an input. In this embodiment a bind processing source program 42 for accessing the definition data 37 of the database that the existing SQL database management system 30 manages and a bind process source program 41 for accessing the data dictionary 38 of the database management system 40 to be developed correspond to the bind process execution program. However, the bind processing execution source programs 41 and 42 can be made common to each other by the use of the range of SQL standards, A bind processing execution program 33 of the existing SQL database management system 30 is used to generate a bind processing execution program 43 which is used to refer to the definition data 37 stored in the data dictionary of the existing SQL database management system 30.

The bind processing execution program 43 cannot refer to the data dictionary of the existing database management system 30 (there is no existing database management system in the place where a new database management system is to be installed). It is, therefore, required to recreate the bind processing execution program 44 in order to refer to the data dictionary 38 defined on the database management system 40 which is being developed.

When the bind processing execution program 44 is generated again by the bind processing execution program 43 which has been generated, this regenerated program 44 refers to the data dictionary 38 of the database management system 40 defined by the definition data 37.

A.3 Generation of Data Definition Process Execution Program

Figure 4B:
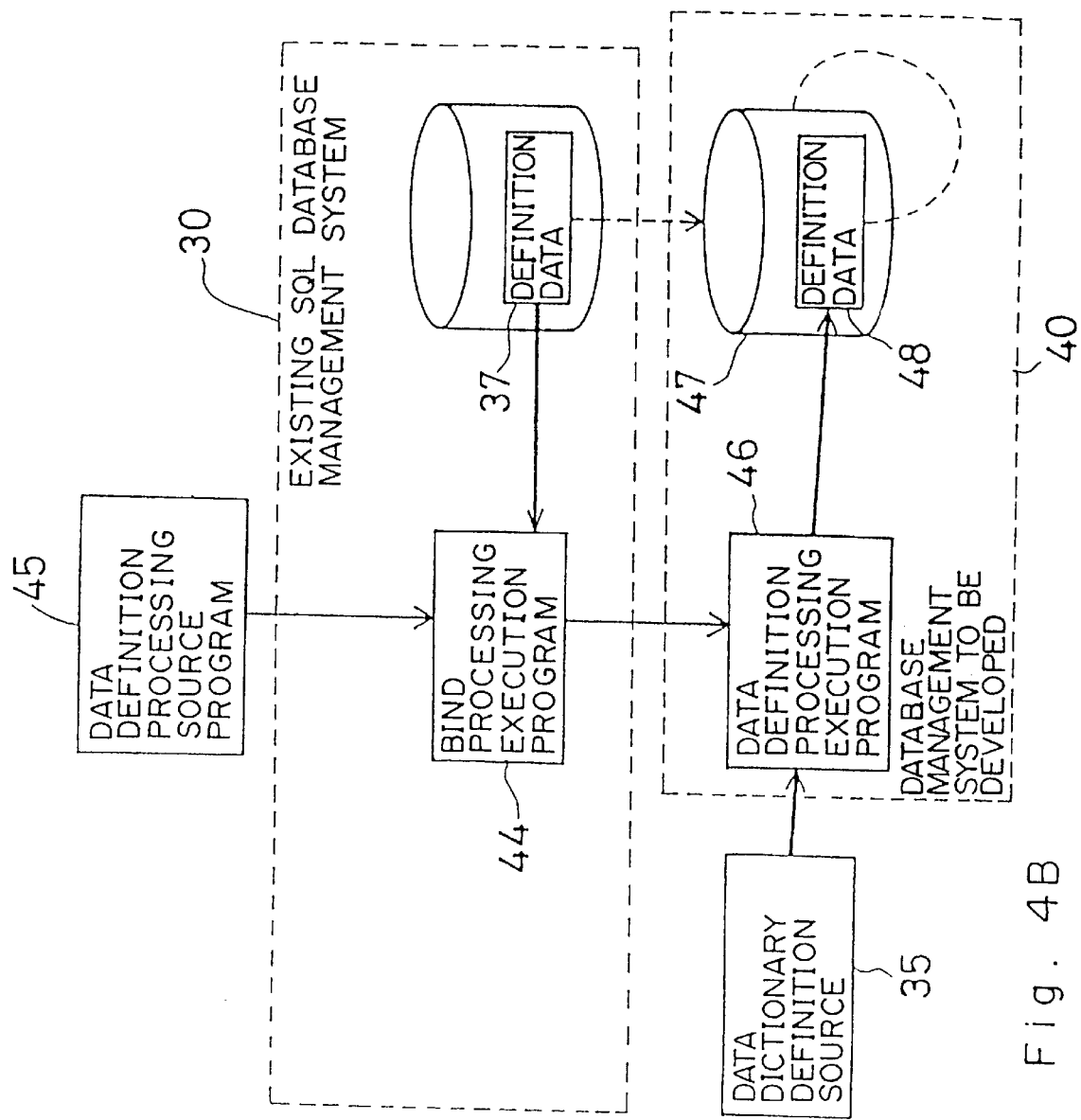
FIG. 4B is a block diagram for use in explanation of the generation of a data definition process execution program according to an embodiment of the present invention.

FIG. 4B is a diagram illustrating the generation of a data definition process execution program 46 according to an embodiment of the present invention.

The database of the database management system 40 to be developed is defined by a data definition process execution program. An execution program is generated by the bind process execution program because a data definition process source program is also defined by the SQL data manipulation statements.

That is, as shown in FIG. 4B, a bind processing execution program 43, which refers to the data dictionary of the existing SQL database management system 30, generates the data definition processing execution program 46 on the basis of a data definition processing source program 45.

A storage medium is set up for a database serving as the data dictionary 47 of the database management system 40. The data dictionary 47 stores its definition data 48 when the data definition processing execution program 46 is executed with the data processing dictionary definition source 35 as an input.

As in the case of the bind processing source program, the data definition processing source program 45 is described in the SQL language of the database management system 40 to be developed and may not be identical with the data definition processing source program 31 shown in FIG. 4A.

The definition data 37 and 48 indicating the structure of the data dictionary have identical contents.

B. Distribution Phase

B.1 Installation

Figure 5:
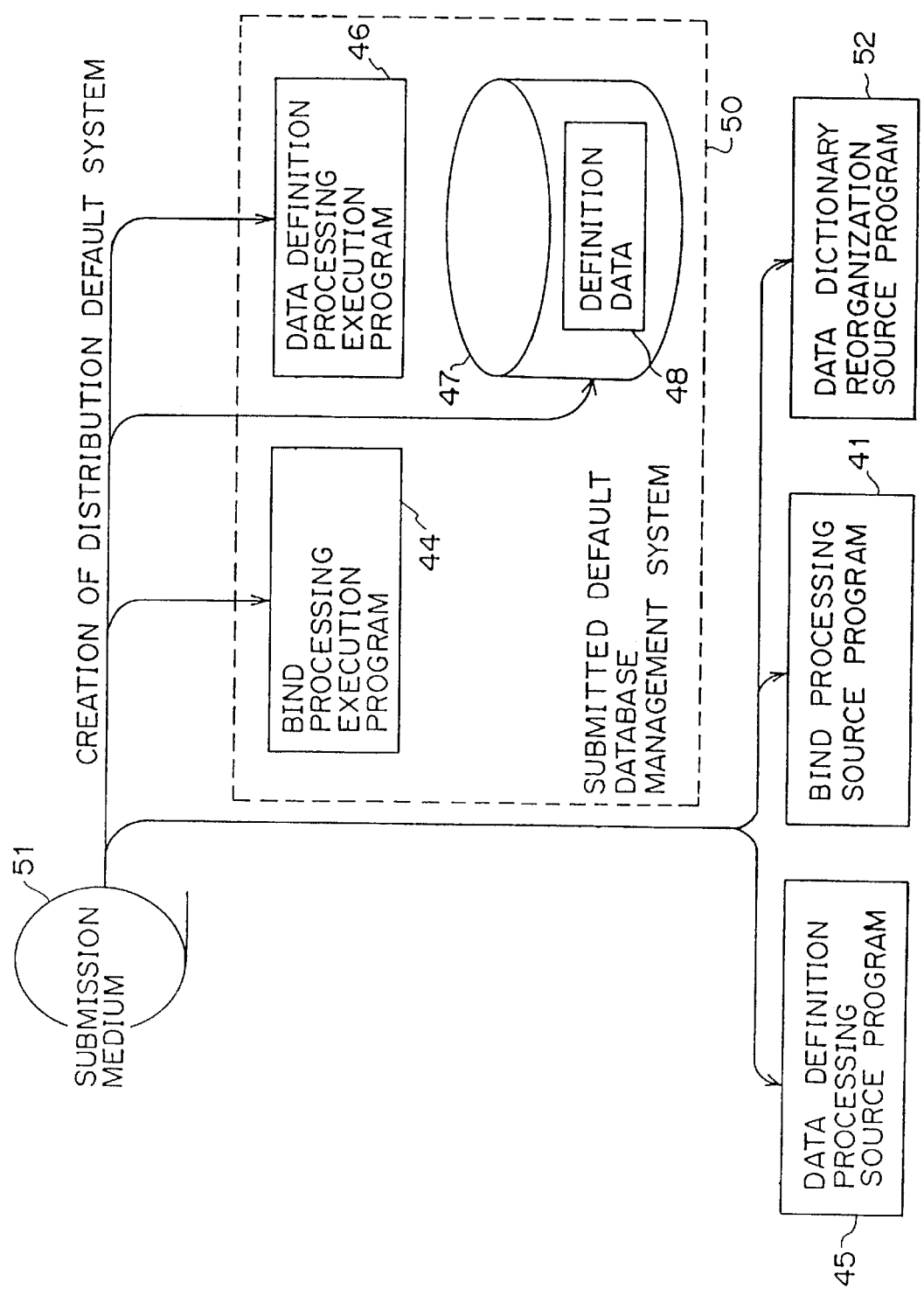
FIG. 5 is a block diagram for use in explanation of the installation according to an embodiment of the present invention.

FIG. 5 is a diagram for use in explanation of installation according to an embodiment of the present invention.

The database management system, which is a candidate for development, is submitted from a submission medium 51 as a submitted default database management system 50. The submitted default database management system 50 contains the bind processing execution program 44, the data definition processing execution program 46 and the data dictionary 47 having its definition data 48.

In the case where customizing is needed in the place where the database management system is distributed, the data definition processing source program 45, the bind processing source program 41 and the data dictionary reorganization source program 52 are further distributed together.

B.2 Modification of Data Dictionary Definition Information

Figure 6:
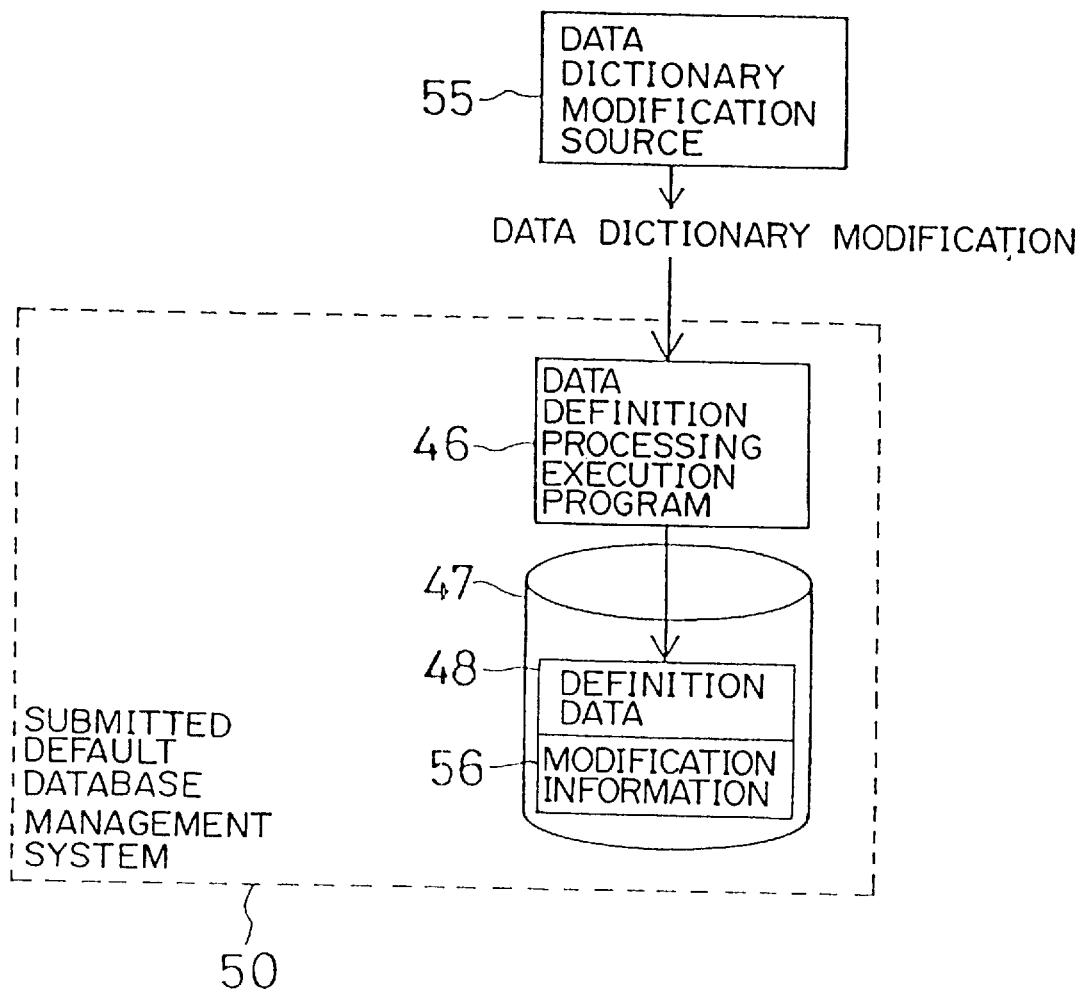
FIG. 6 is a block diagram for use in explanation of the modification of data dictionary definition information according to an embodiment of the present invention.

FIG. 6 is a diagram for use in explanation of modification of data dictionary definition information according to an embodiment of the present invention.

When modifications are to be made to the data dictionary 47 where the database management system is distributed, a data dictionary modification source 55 describing necessary contents of modification is generated first.

The contents of the data definition are modified by the data definition processing execution program 46. It is to be noted that modifications are made to data for defining the structure of the data dictionary but are not made to the data structure itself.

Since the distributed or provided bind and data definition process execution programs do not operate while referring to the definition data on the data dictionary, modifications to the data definition information will not affect the run of these programs.

B.3 Generation of Execution Program for Modified Data Dictionary

Figure 7:
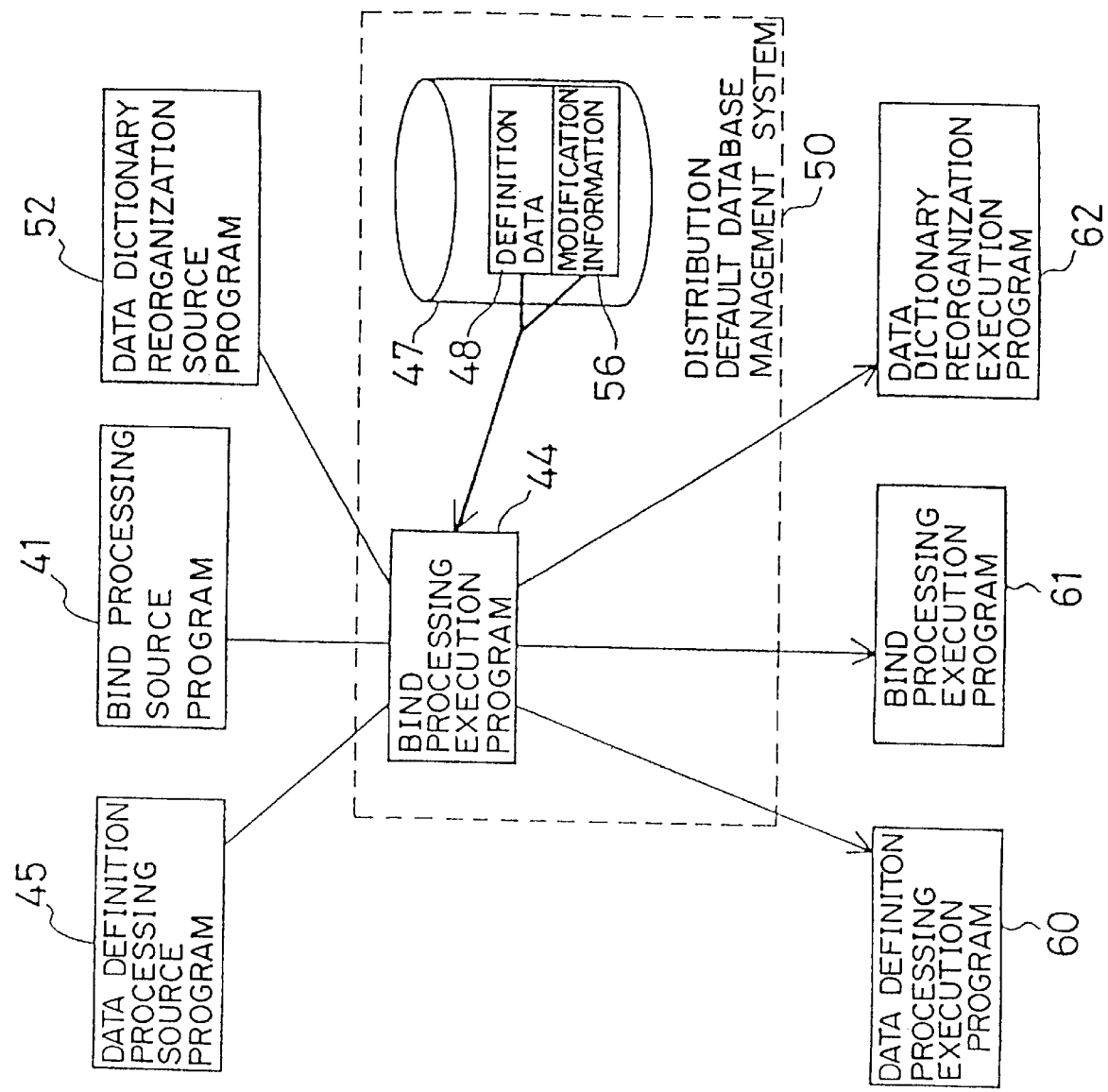
FIG. 7 is a block diagram for use in explanation of the generation of a modified execution program according to an embodiment of the present invention.

FIG. 7 is a diagram for use in explanation of an execution program after modification according to an embodiment of the present invention.

The bind processing execution program and the data definition processing execution program at the time of distribution or provision cannot make access to the data structure defined by the modified data dictionary 47. Thus, these programs are generated as executable programs by the bind processing execution program 44.

Data definition processing execution program 60, bind processing execution program 61 and data dictionary reorganization execution program 62 are respectively formed, by using, as an input, data definition process source program 45, bind process source program 41, and data dictionary reorganization source program 52, which are provided.

B.4 Modification of Data Dictionary Structure

Figure 8:
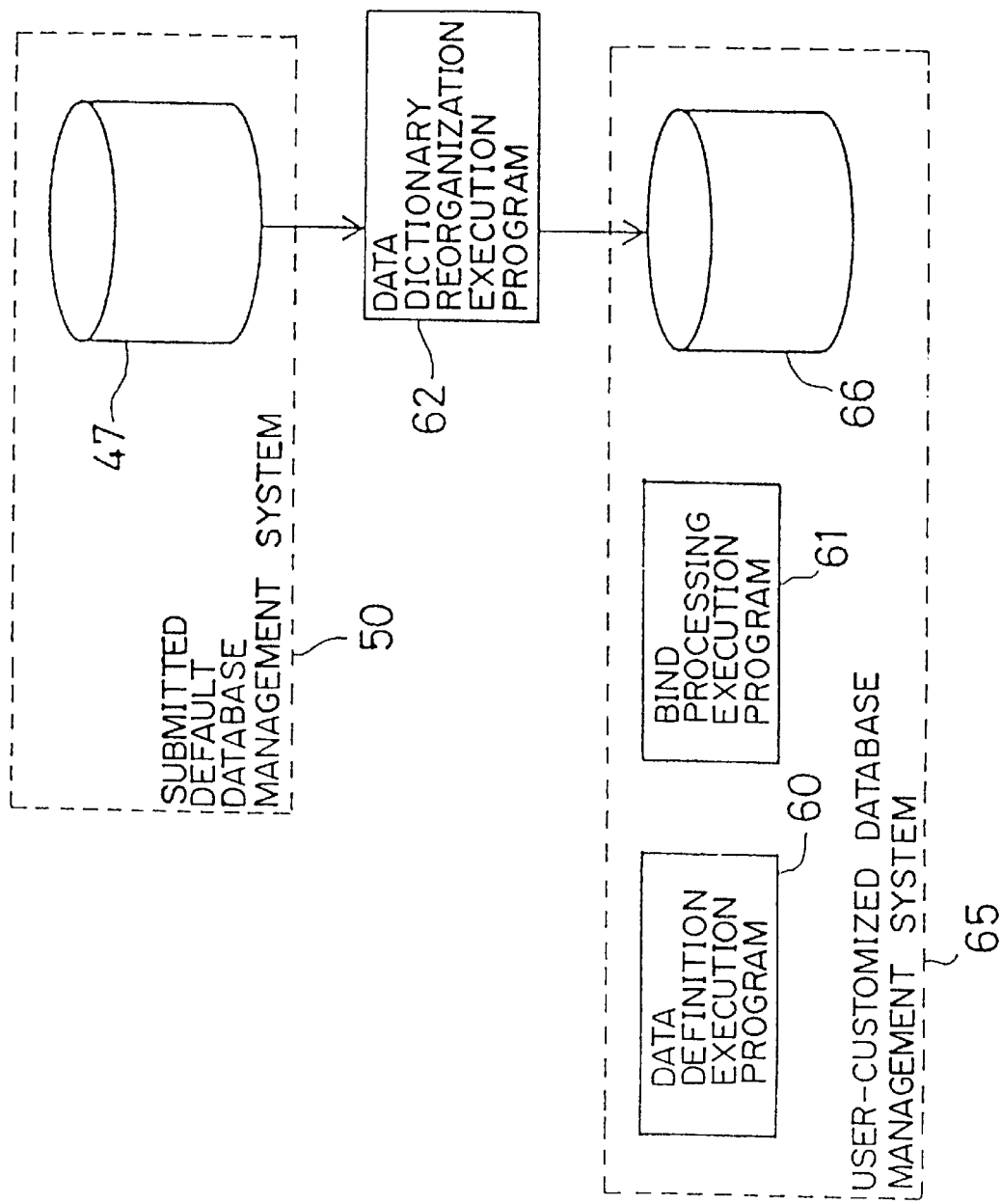
FIG. 8 is a block diagram for use in explanation of the modification of the structure of a data dictionary according to an embodiment of the present invention.

FIG. 8 is a diagram for use in explanation of modification of data dictionary structure according to an embodiment of the present invention.

Modification is made to the structure of the data dictionary 47 using the generated data dictionary reorganization execution program 62. The modified data dictionary 66, the data definition processing execution program 60 and the bind processing execution program 61 allows the user-customized database management system 65 to be implemented in the place where it is distributed.

Next, specific configurations of the bind process (source/execution) programs and the data definition (source/execution) programs will be described in accordance with embodiments.

Owing to the self-description, the positioning of the bind processing program and the data definition processing program are made such that a creation sequence and structure and an execution environment of the application program is the same as those when access is made to the database by using an application program formed by a user.

The generation and structure of the application program will be described first and then the processing logic and structure of the bind process program and the positioning of the dictionary will be described.

[1] Generation, Structure and Execution of Application Program

A user-generated application program is described in the format in which SQL statements, which make requests for access to the table (database), are embedded in processing logic for implementing facilities that the application program intends by the host language such as the C language, the COBOL language, etc. The translation process of the program and the database access process at the execution time will be described.

1.1 Generation (Translation) Process of Application Program

Figure 9B:
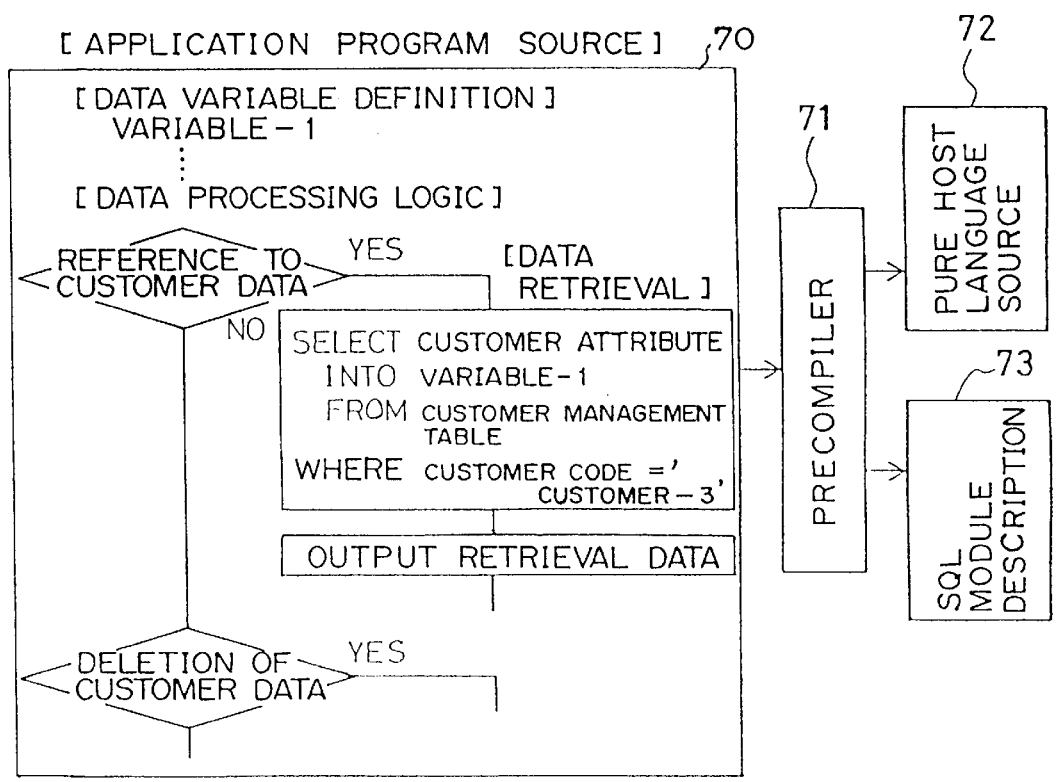

FIGS. 9A, 9B and FIG. 10 are diagrams for use in explanation of the translation process of an application program.

For example, consider an application program which treats such a customer management table as shown in FIG. 9A.

The translation phase of the application program is illustrated in FIG. 9B and FIG. 10.

An application program source 70 is separated by a precompiler 71 into a pure host language source 72 depending upon the host language, such as the C language, the COBOL language, etc., and an SQL module description 73 which has extracted only SQL statements. In the SQL module description 73, entry definition and its parameter information are set. In the pure host language source 72, on the other hand, an SQL-statement describing section is replaced with a calling process of entries to a database access procedure 78 corresponding to the procedure in the SQL module description 73.

The pure host language source 72 is converted to an executable form by a host-language-dependent compiler 74 to generate an application program logic procedure 77. The SQL module description 73 is converted to an executable form by a bind processing program 75 to generate a database access procedure 78. The execution of the application program is performed by an executable module 76 comprised of the two executable procedures.

1.2 Structure of Database Access Procedure

Figure 11:
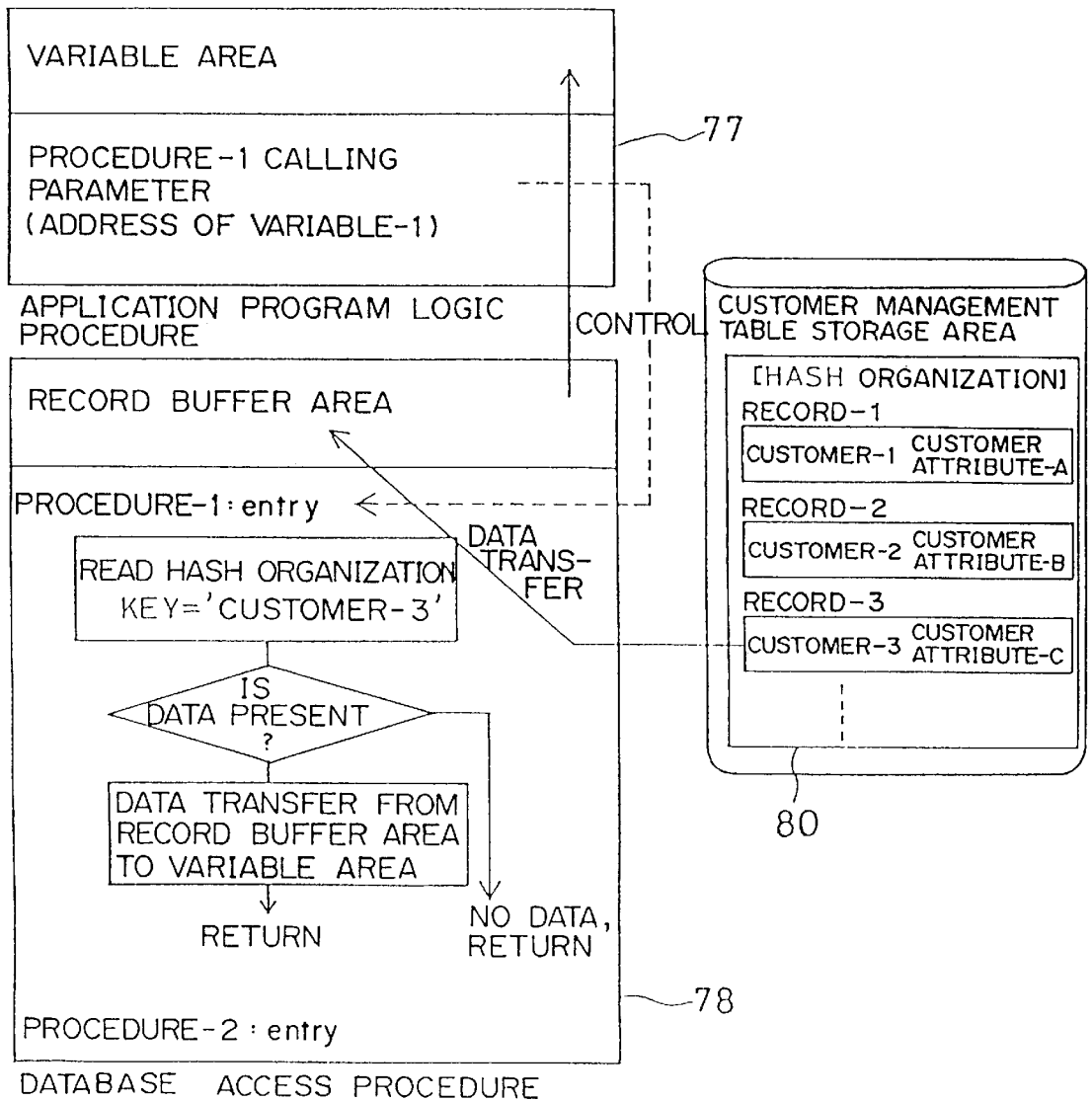
FIG. 11 is a block diagram with an embedded flowchart for use in explanation of a database access procedure.

FIG. 11 is a diagram for use in explanation of the database access procedure. In the figure, 80 designates a customer management table storage area.

The structure of the database access procedure 78 represents a storage-structure-dependent record access procedure which corresponds to query description designated by SQL statements.

The structure of the customer management table, which is a candidate for processing by the application program, on the database and the database access procedure, therefore, are illustrated in FIG. 11. In this example, the customer management table is stored in a dynamic hash (DHASH) organization in which a customer code column is used as a storage key. From the application program is made a call (procedure-1) of an entry in the SQL module description corresponding to an SQL statement. The database access procedure has an entry section corresponding to the procedure-1 and such a procedure as to perform a record retrieval process (READ HASH organization) by a key value for the DHASH organization. Subsequently, the presence or absence of a record is examined by retrieval and retrieved data is transferred to a variable area of the application program logic procedure 77, thereby completing the database access process.

Therefore, no reference is made to the table structure and the storage structure in the process of the database access procedure 78.

1.3 Outline of Processing by Bind Processing Program

Figure 12:
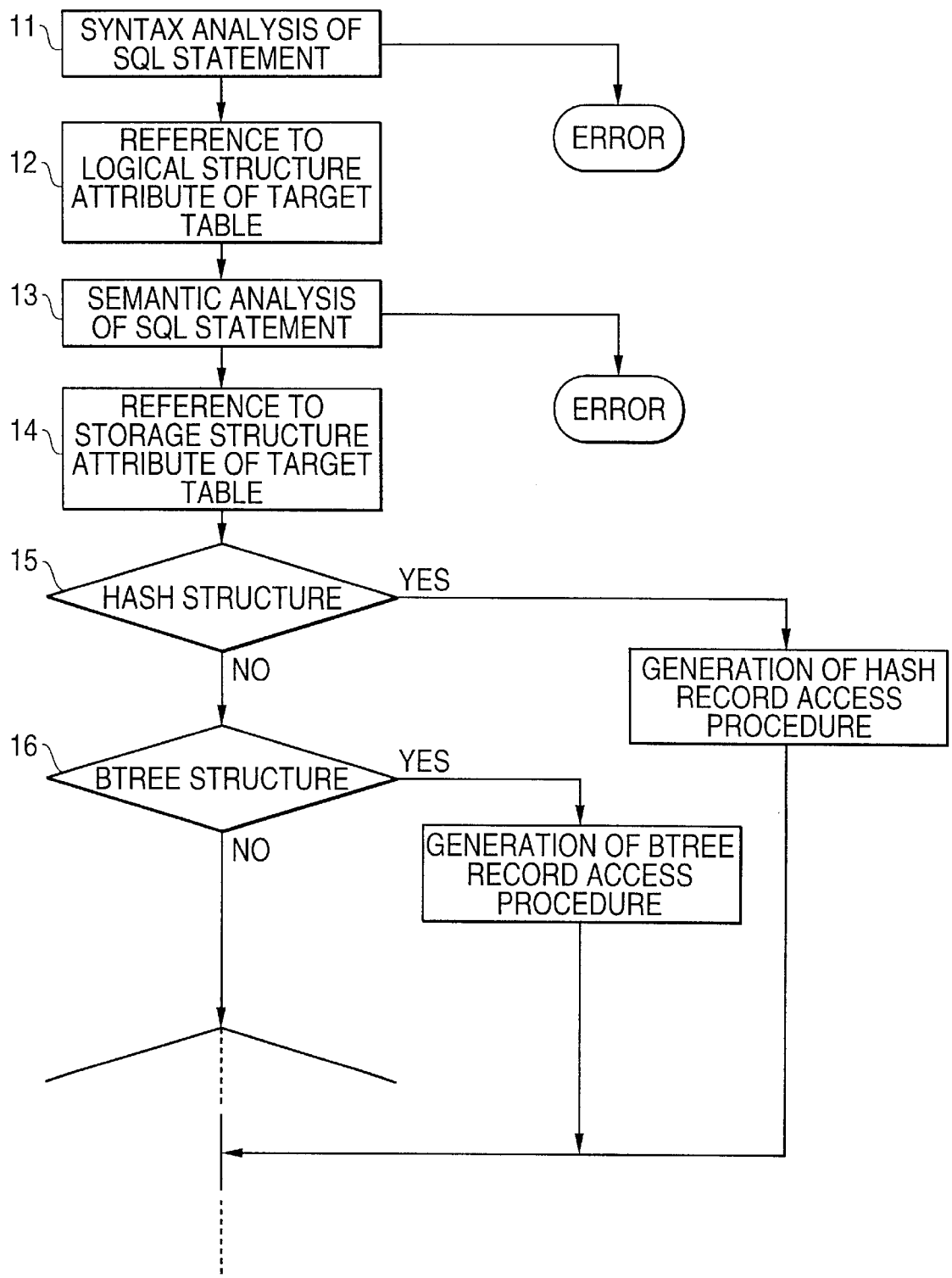
FIG. 12 is a flowchart for use in explanation of the processing logic of a bind process execution program.

FIG. 12 is a diagram for use in explanation of the processing logic of the bind processing program.

The bind processing program generates a procedure which responds to a query described by an SQL statement to refer to logical structure attributes and storage structure attributes for a designated table and make access to a record on the target storage structure.

That is, as indicated by 11 to 16 of FIG. 12, a storage-structure-dependent database access procedure is generated after syntax analysis and semantic analysis have been made of SQL statements in the SQL module description on a statement-by-statement basis. In the semantic analysis process, since an examination is made of the presence or absence of a table name and a column name designated by an SQL statement, reference is made to the logical structure attribute of the target table. In addition, to generate a storage-structure-dependent record access procedure, reference is made to the storage structure attribute of the table.

[2] Structure of Bind Processing Program and Data Definition Information

In the present invention, the bind processing program is also similar to the application program in structure. The query into a table described by the application program corresponds to the query into a table for managing the table definition information.

2.1 Structure and Generation of Bind Processing Program

Figure 14:
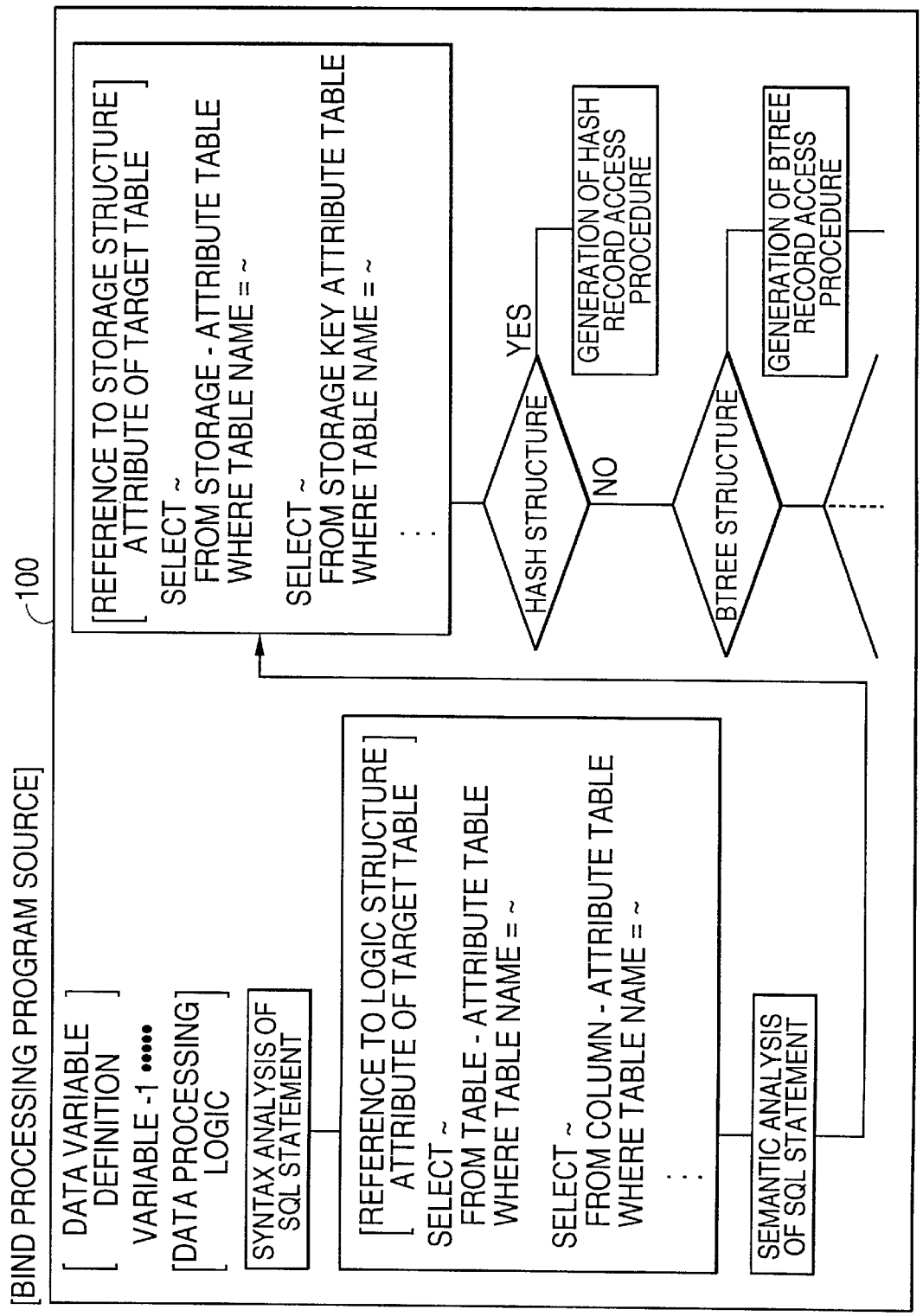
FIG. 14 is a flowchart illustrating an example of a bind process program source according to an embodiment of the present invention.
Figure 15:
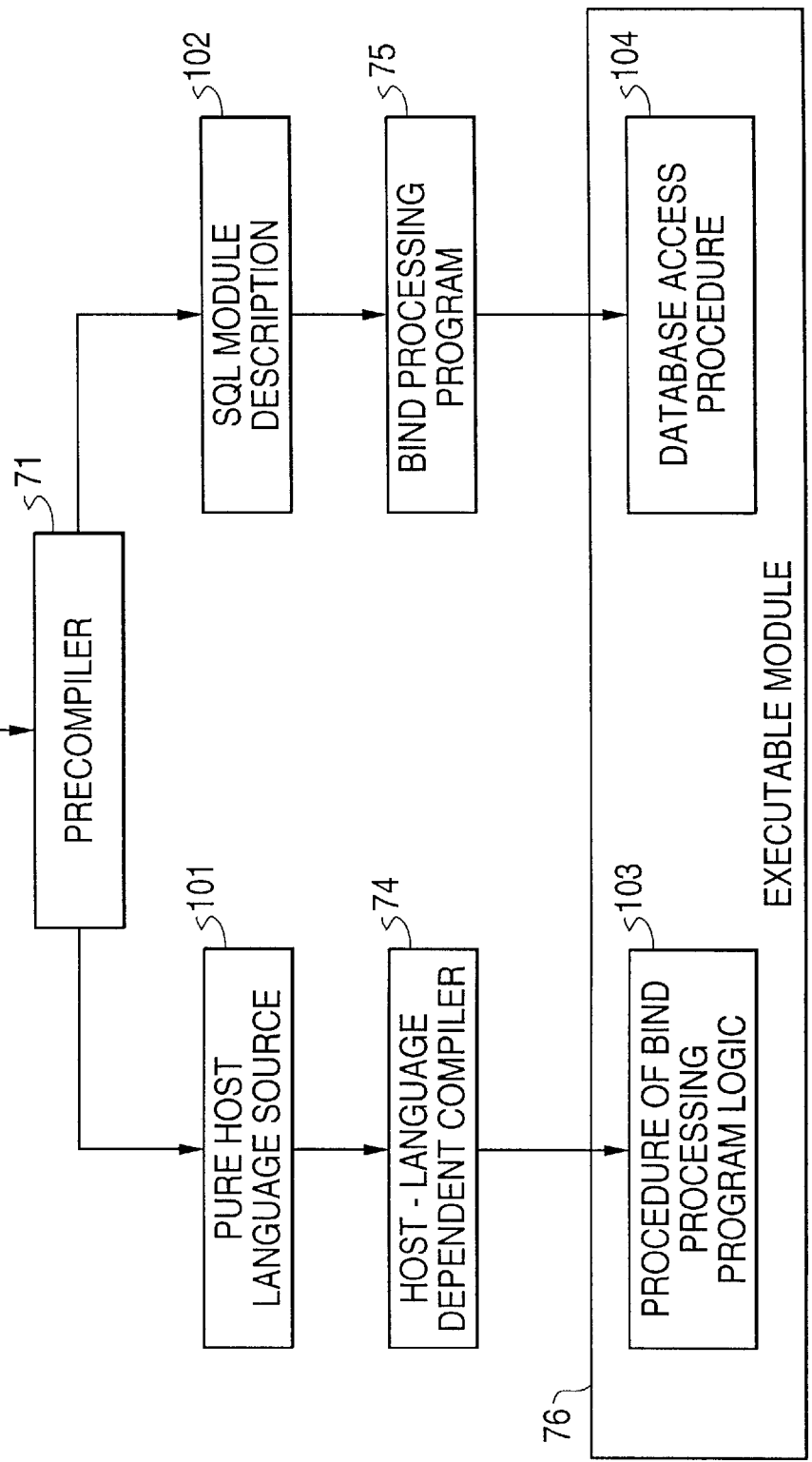
FIG. 15 is a block diagram for use in explanation of the structure of a bind processing program according to an embodiment of the present invention.

FIGS. 13A to 13D are diagrams illustrating examples of the table for managing the definition table, FIG. 14 is a diagram illustrating an example of the bind processing program source according to an embodiment of the present invention, and FIG. 15 is a diagram illustrating the structure of the bind processing program according to an embodiment of the present invention.

The bind processing program source, like the application program, incorporates SQL module descriptions to refer to such tables as shown in FIGS. 13A–D into the host language source. FIG. 14 illustrates an example of the bind processing source program. That is, among the blocks of the processing logic of the bind processing program shown in FIG. 12, the block for making reference to the logical structure attribute and the block for making reference to the storage structure attribute correspond to queries into the table for managing the definition information. The other blocks have processing logic peculiar to the bind processing.

The application program makes access to user-generated tables, while the bind processing program makes access to system tables, such as a table-attribute table, a column-attribute table, a storage-attribute table, a storage-key attribute table, etc. shown in FIG. 13, which manage user-defined table information. Thus, the SQL description blocks for making access to the tables are converted to an executable form by the bind processing program at the time of the generating (translating) of the bind processing program as well.

FIG. 15 illustrates a processing of generating an executable module 76 of the bind processing program from the bind processing program source 100, which is similar to the translation process of the application program described in connection with FIG. 9 and FIG. 10.

The development of an initial bind processing program is performed such that a database access procedure is generated utilizing another database management system or access to the database is circumvented with the data definition information utilized by the bind processing program set fixed.

2.2 Execution of Bind Processing Program

As with the application program, the bind processing program can also be executed by making access to the database which manages definition information.

Note that the structure of the data definition processing program is substantially the same as that of the bind processing program.

After the syntax analysis and semantic analysis of the SQL data definition statements have been performed, the data definition processing program updates (including insertion and deletion) definition data of the database. The data definition processing program, like the application program and the bind processing program, is composed of the host-language-dependent processing logic and SQL statements for making an query into tables.

[3] Relation between Bind Processing Program and Dictionary

The structure of the bind processing program, as described in [2], is the generation procedure and the execution procedure which are the same as in the application program in the sense that it makes access to the database which manages data definition. The positioning of an actual bind processing program, an actual processing program and an actual database will be put in order herein.

Figure 16:
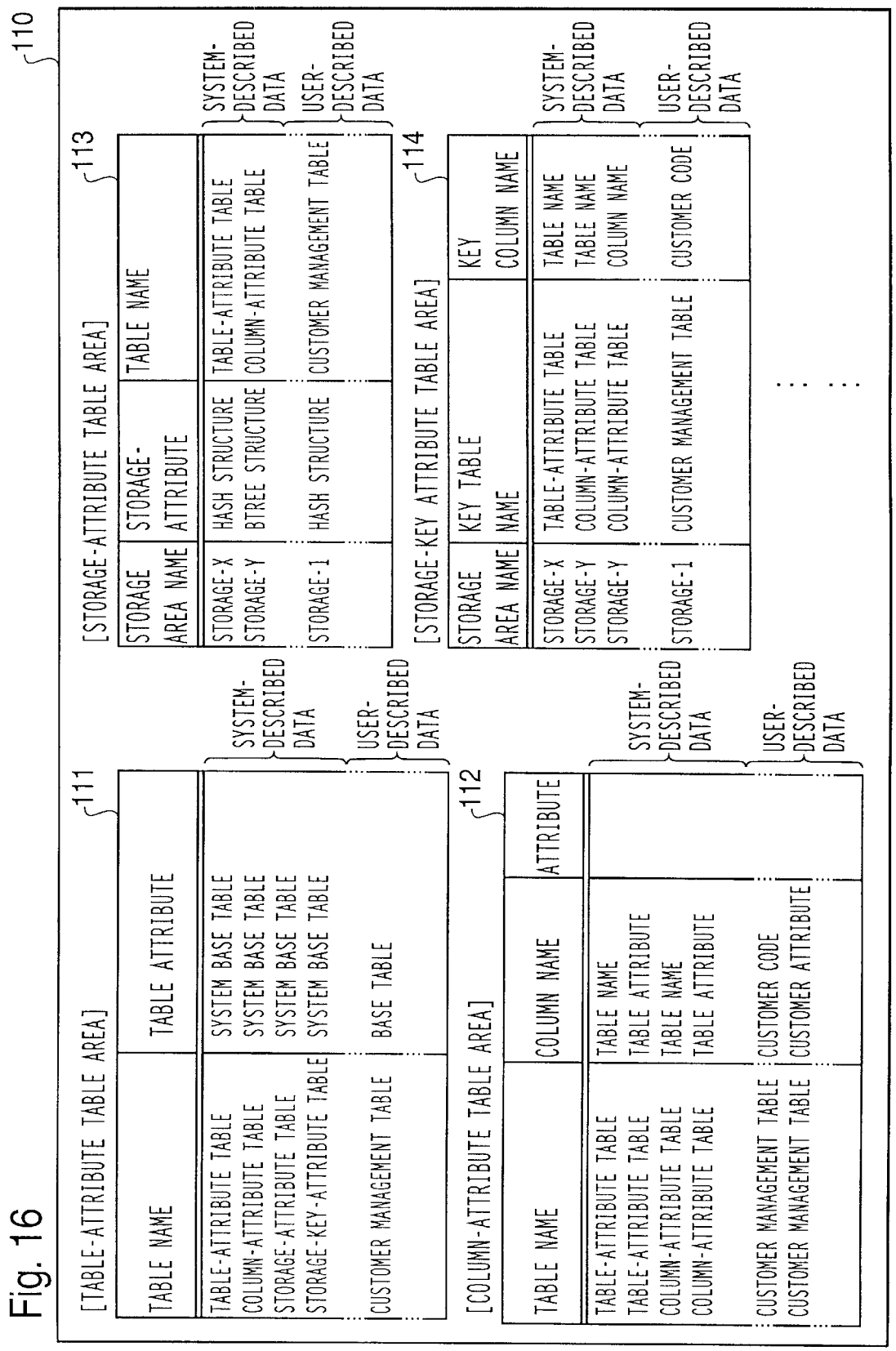
FIG. 16 is an explanatory view of the structure of a dictionary according to an embodiment of the present invention.
Figure 17:
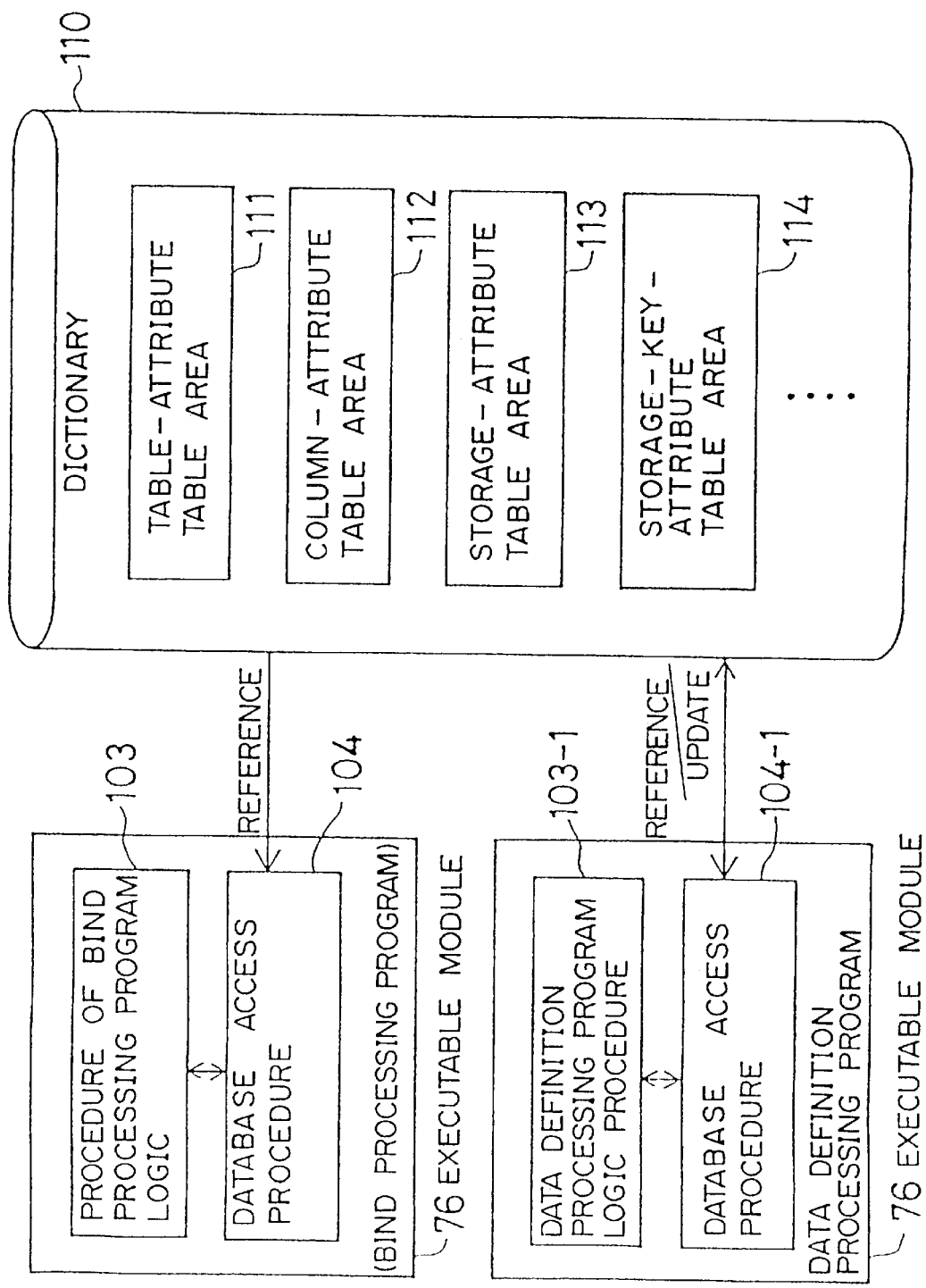
FIG. 17 is a block diagram for use in explanation of an execute environment of a bind processing program and data definition processing program according to an embodiment of the present invention.
Figure 18:
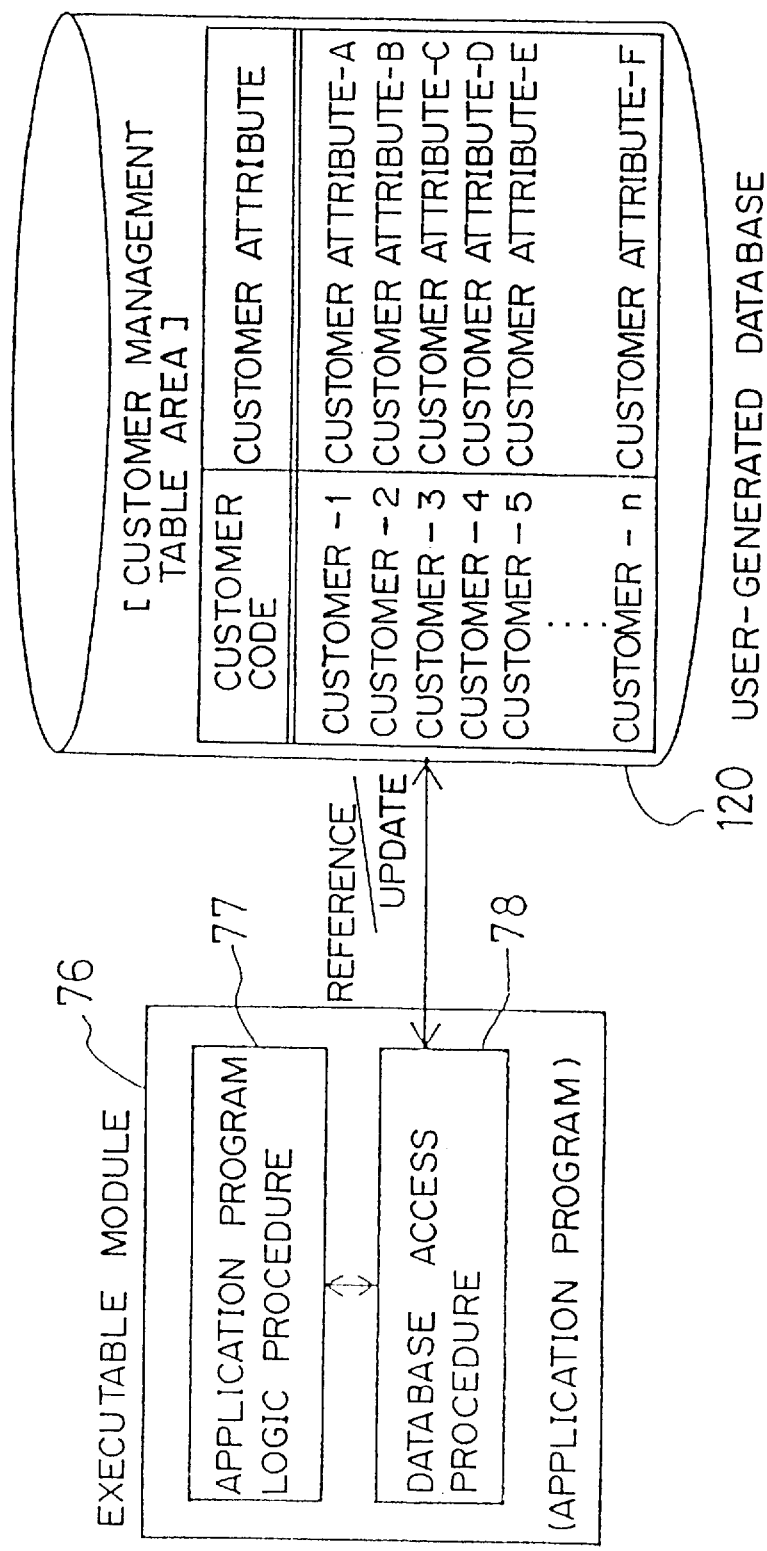
FIG. 18 is a block diagram with an embedded table for use in explanation of an execute environment of an application program according to an embodiment of the present invention.

FIG. 16 is a diagram for use in explanation of the structure of a dictionary according to an embodiment of the present invention, FIG. 17 is a diagram for use in explanation of an execution environment according to an embodiment of the present invention, and FIG. 18 is a diagram for use in explanation of an application program execute environment according to an embodiment of the present invention.

The database which is an object of the bind processing program and data definition processing program is called a dictionary in the sense that it manages a user-generated database. The dictionary has the logical structure and storage structure equivalent to those described above in respect of the structure of the database. Thus, the application program is also permitted to make access to the dictionary.

FIG. 16 illustrates this example. System-described data and user-described data are stored in each of a table-attribute table area 111, a column-attribute table area 112, a storage-attribute table area 113, a storage-key-attribute table area 114, etc.

That is, the dictionary 110 has data describing the dictionary's structure itself (system-described data) as well as user-described table information. The system-described data can also be referred to by the application program. The data is employed at the time of the customizing of the dictionary which will be described later.

The positioning of the dictionary, the database and the bind processing and data definition processing programs is shown in FIG. 17. Also, the positioning of the application program is shown in FIG. 18.

The executable modules 76 of the bind processing program and the definition processing program refer to or update the above-described dictionary 110 in accordance the database access procedures 104, 104-1. The database access procedure 78 in the application program executable module 76 refers to and/or updates a user-generated database 120.

[Example of Process of Customizing Dictionary by User]

Next, an example of user customizing according to the present invention will be described with reference to FIGS. 19A to 24.

User tailoring of the dictionary structure can be performed in substantially the same procedure as a table structure modification process, which is performed in implementing general databases, by self-describing data management. The modification of the database structure requires reorganization process of data itself and reorganization of the application program which accesses the database. In the modification of the dictionary structure, a candidate for reorganization corresponds to the dictionary and an access program corresponds to the bind processing program and the data definition processing program.

Hereinafter, distributed matters at the time of the installing of the database management system and their relationship will be described. A description will be made of that user-customizing of the dictionary is possible in accordance with procedures when modifications are made and are not made to the structure of the dictionary distributed as default.

[1] Distributed Matters at the time of Installation and Structures thereof.

Main distributed matters required to customize the dictionary and structures thereof will be described.

FIGS. 19A, 19B, 20A, 20B, 20C, 20D, 21A and 21B illustrate examples of distributed matters at the time of the installation according to an embodiment of the present invention.

When a database management system is installed, a dictionary data area (DIC-SPACE) 200 is secured and definition data for defining the default structure of the dictionary is set in the area. Data definition description (DIC-SOURCE1) 201 which defines the default data structure is distributed.

Also, a bind processing program (BIND-PROG) 204 for converting an application program to an executable form, a data definition processing program (DDL-PROG) 208 for processing data definition and a dictionary reorganization program (RE-PROG) 213 for processing reorganization of the dictionary are installed.

The bind processing program (BIND-PROG) 204 is composed of a section (BIND-PROG-HOST) which is in an executable form to which processing logic described in the host language has been converted and a section (BIND-PROG-DB) 206 which is in an executable form to which an SQL statement described by an SQL module has been converted.

Also, SQL module description (BIND-SOURCE-DB) 203 which has collected all the SQL statements corresponding to the database access processing sections (BIND-PROG-DB) 206 is distributed. The data definition processing program 208 is also distributed which, like the bind processing, is composed of a section (DDL-PROG-HOST) 209 which is in an executable form to which the processing logic described in the host language has been converted and a section (DDL-PROG-DB) 210 which is in an executable form to which an SQL statement described by an SQL module has been converted. Also, SQL module description (DDL-SOURCE-DB) 207 for data definition processing is distributed.

These programs are generated to be allowed to make data access to the default data structure (BIND-PROG-DB, DDL-PROG-DB).

The dictionary reorganization program (RE-PROG) 213, like the bind processing, is composed of a section (RE-PROG-HOST) 214 which is in an executable form to which processing logic described in the host language has been converted, a section (RE-PROG-DB1) 215 which is in an executable form to which an SQL statement which is described by an SQL module and retrieves dictionary data has been converted and a section (RE-PROG-DB2) 216 which is in an executable form which is described by an SQL module and inserts dictionary data has been converted.

Also, SQL module description (RE-SOURCE-DB1) 211 corresponding to dictionary data retrieval for dictionary reorganization and SQL module description (RE-SOURCE-DB2) 212 corresponding to dictionary data insertion are distributed.

Figures 19A, 19B:
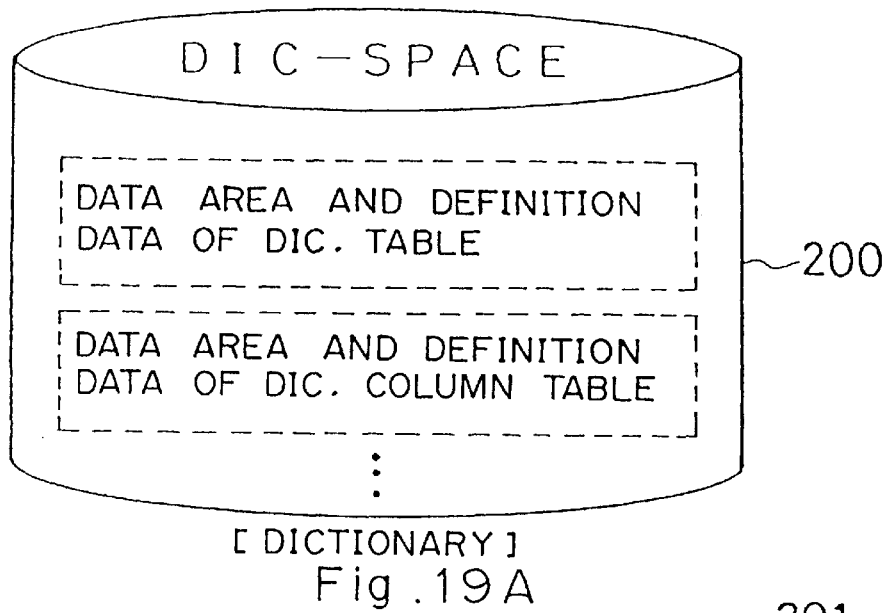
FIGS. 19A and 19B, FIG. 20A to 20D, and FIGS. 21A and 21B are explanatory views illustrating examples of matters submitted at the time of installation according to an embodiment of the present invention.
Figure 20A:
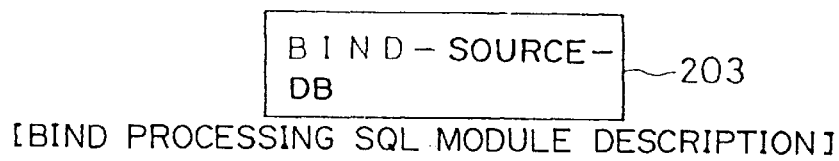
Figure 20B:
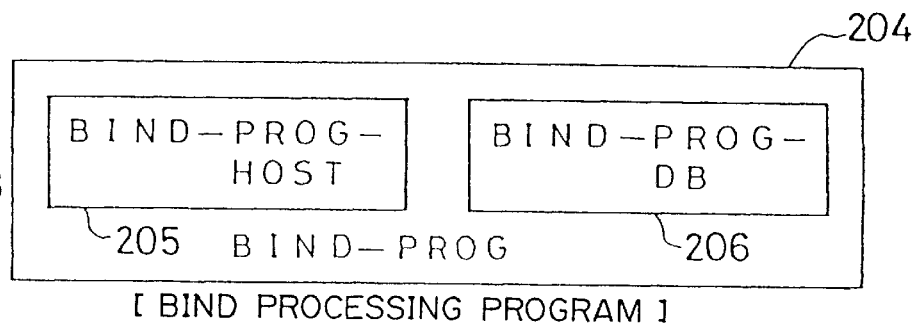
Figure 20C:
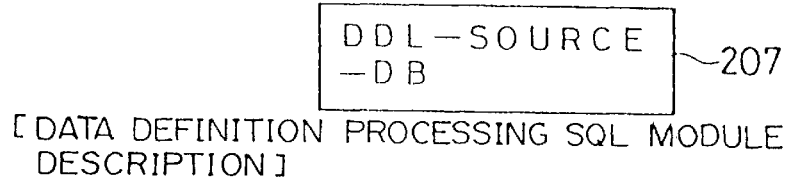
Figure 20D:
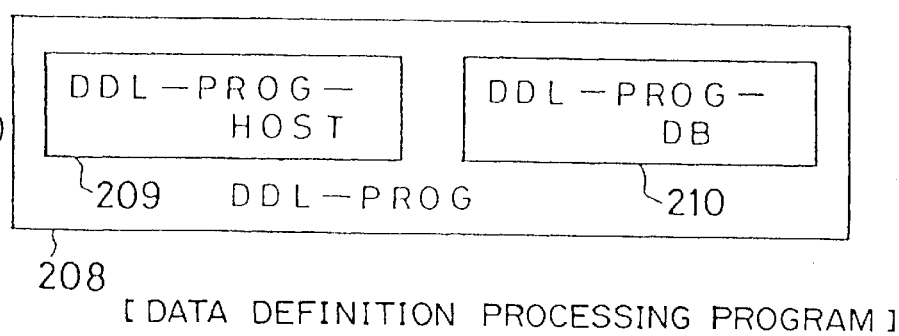
Figure 21A:
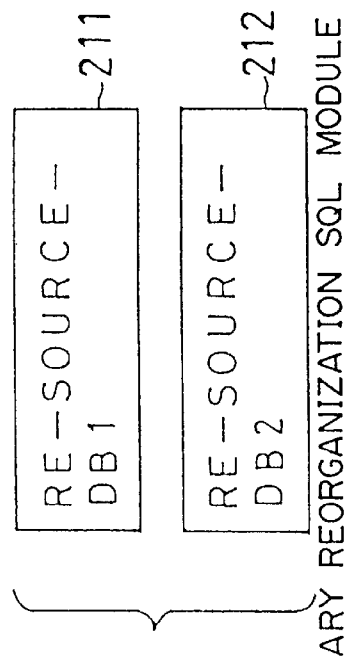
Figure 21B:
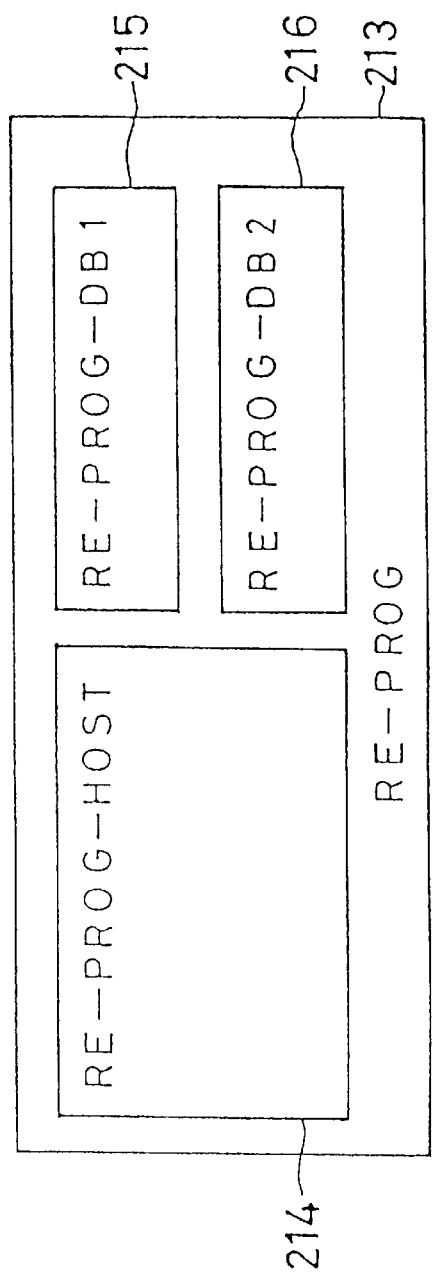

Data definition description (DIC-SOURCE1) 201 shown in FIG. 19B corresponds to a dictionary structure which is fed into by a dictionary access section processed within the bind processing program and the data definition processing program at the time of the installation. The SQL statements shown in the figure, such as CREATE TABLE, etc., define the structure of a table for managing tables and columns which are managed in the dictionary. Data definition description, such as storage-structure attributes, etc., is also included herein.

[2] Implementation by Default Dictionary Structure

At the time of the distribution, the bind processing program and the data definition processing program are capable of access processing (BIND-PROG-DB, DDL-PROG-DB) for the default dictionary structure. The dictionary contains definition data defining the default data structure. It is thus possible to immediately start to implement the database in the state when it is installed.

[3] Customizing of Dictionary Structure

Customizing of the dictionary data structure at the time of the installation is performed by modifying the default data definition description to a data structure intended by the user and then storing it on the dictionary by the data definition processing program. In this state, the data definition processing program, the bind processing program and a new dictionary reorganization program are regenerated by the bind processing program at the time of the distribution. These new programs are converted to permit data access to a new dictionary structure.

Next, new dictionary definition data retained in the dictionary is reorganized as a new dictionary by the new dictionary reorganization program which has been generated previously.

3.1 Setting of Dictionary Data Structure

Figure 22:
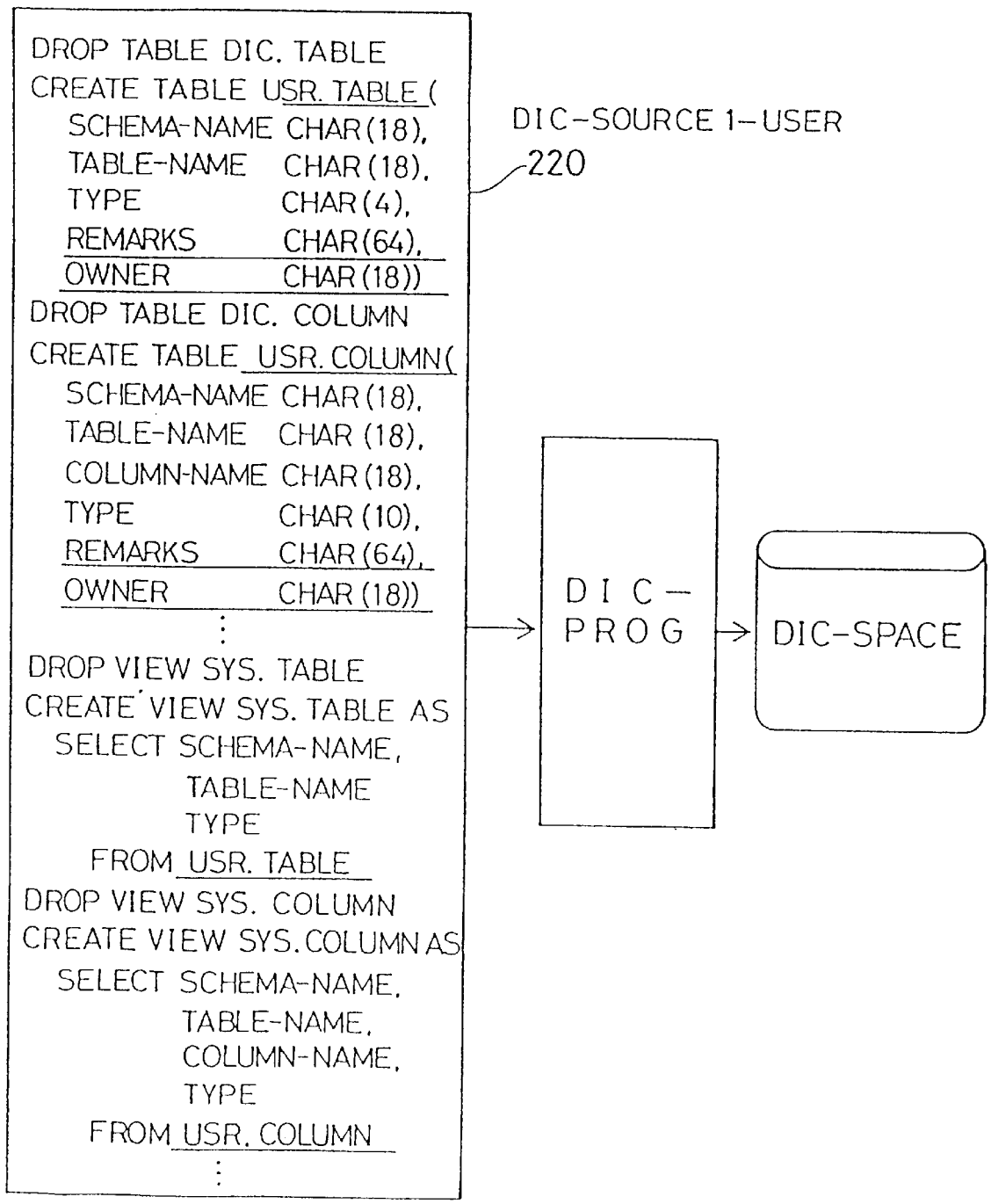
FIG. 22 is an explanatory view of the modification of dictionary definition data according to an embodiment of the present invention.

FIG. 22 is a diagram for use in explanation of modification of dictionary definition data according to an embodiment of the present invention.

The designation of the new dictionary structure is performed by creating and processing data definition description for modifying the default dictionary structure. In this state, the data definition processing program itself stores data for defining the new dictionary structure on the default dictionary structure.

The dictionary structure is set in such a manner as shown in FIG. 22.

Data definition description (DIC-SOURCE1-USER) 220 has been created with reference to default data description (DIC-SOURCE1). In the present example, the modification of the name of a table (DIC. TABLE, DIC. COLUMN) for managing the logical data structure and the addition of a user column to the present table are indicated. Also, a revision is made to match view definition provided to guarantee the table name and the column name which are fixedly referred to by the bind processing program and the data definition processing program.

The view definition that the system programs utilize is as follows.

The bind processing program and the data definition program require to utilize fixed table and column names for the purpose of referring to essential information as the data structure of the dictionary. On the other hand, in the case of modification of the dictionary structure by the user, modification of the table and column names to new names is desired sometimes. For this reason, in the dictionary data description, sections which are candidates for reference or modification by the bind processing program and the data definition processing program are isolated from base table modification by the view definition. Thereby, it becomes possible to modify table names and column names of default values.

In addition, the modification of the storage structure of data (modification of the data organization, storage key data, etc.) in these tables will also become possible.

3.2 Modification of System Programs

The data definition processing program, the bind processing program and the dictionary reorganization program are recreated to accommodate the user-defined new dictionary structure.

The recreation is performed by referring to the new dictionary definition information stored in the dictionary by the bind processing program at the time of the distribution. The dictionary accessing SQL module description utilized for creating the data definition processing program and the bind processing program is converted by the bind processing program at the time of the distribution to accommodate the new dictionary structure. The dictionary data retrieval SQL module utilized for the dictionary reorganization program is not a candidate for recreation because it is required to operate as the dictionary structure prior to modification.

Figure 23:
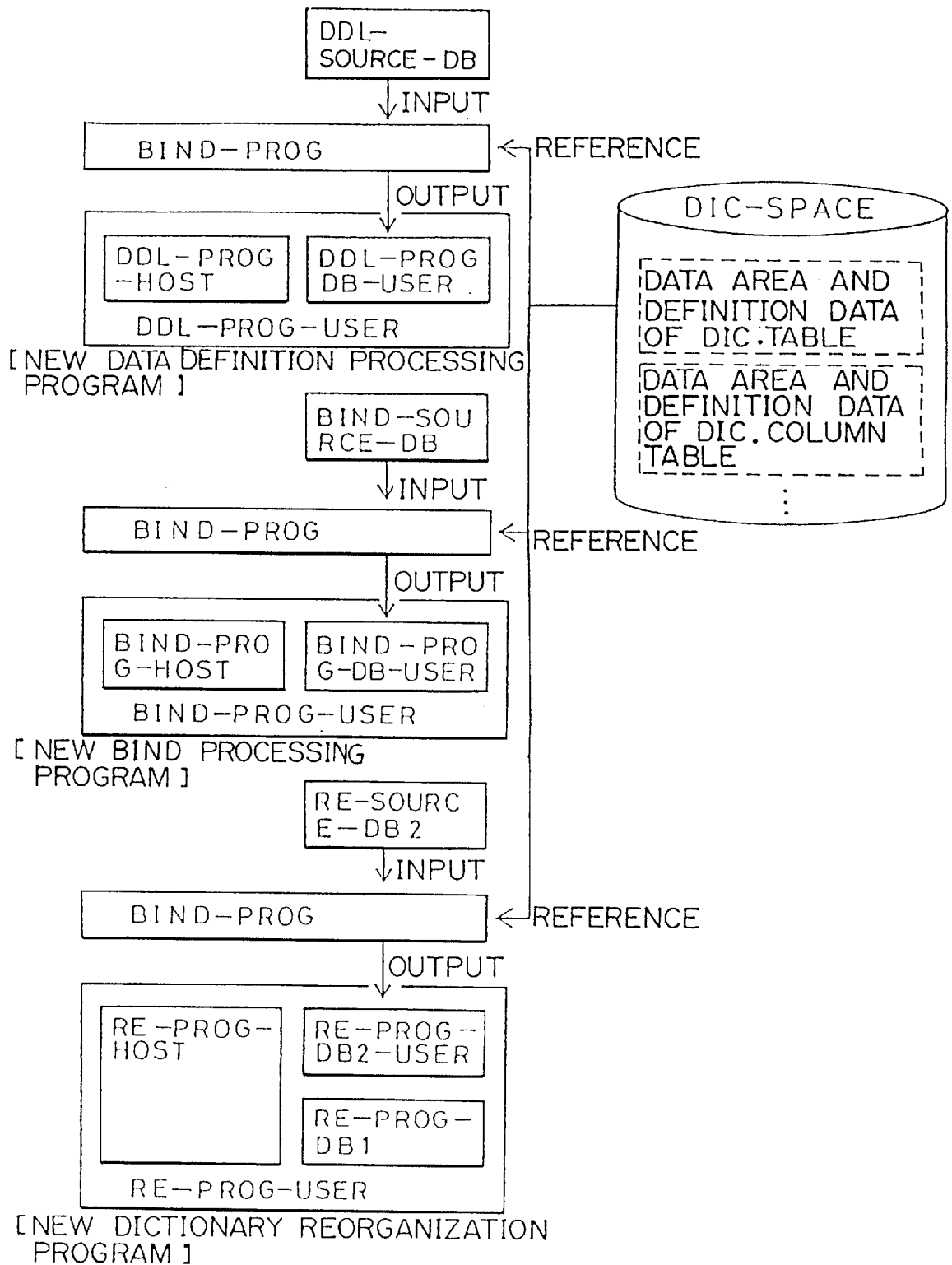
FIG. 23 is a flowchart for use in explanation of the recreation procedure for a data definition process program, a bind process program and a dictionary reorganization program according to an embodiment of the present invention.

FIG. 23 is a diagram for use in explanation of a recreation procedure for the data definition processing program and the bind processing program according to an embodiment of the present invention.

As shown in this figure, the bind processing program (BIND-PROG) at the time of the distribution makes reference to the new dictionary definition data which has been set in the previous section 3.1 to generate an access procedure for a dictionary which is adaptable to a new data structure which has not been created yet.

3.3 Reorganization to New Dictionary

The dictionary in this state takes a form in which data describing the new dictionary structure is stored on the dictionary structure defined by the default data structure. On the other hand, the data definition processing program and the bind processing program for the new dictionary structure have been converted to permit data access to the new dictionary structure. Thus, the dictionary definition data retained in the dictionary in this state is reorganized on a structure which is defined as a new dictionary structure by the new dictionary reorganization program.

Figure 24:
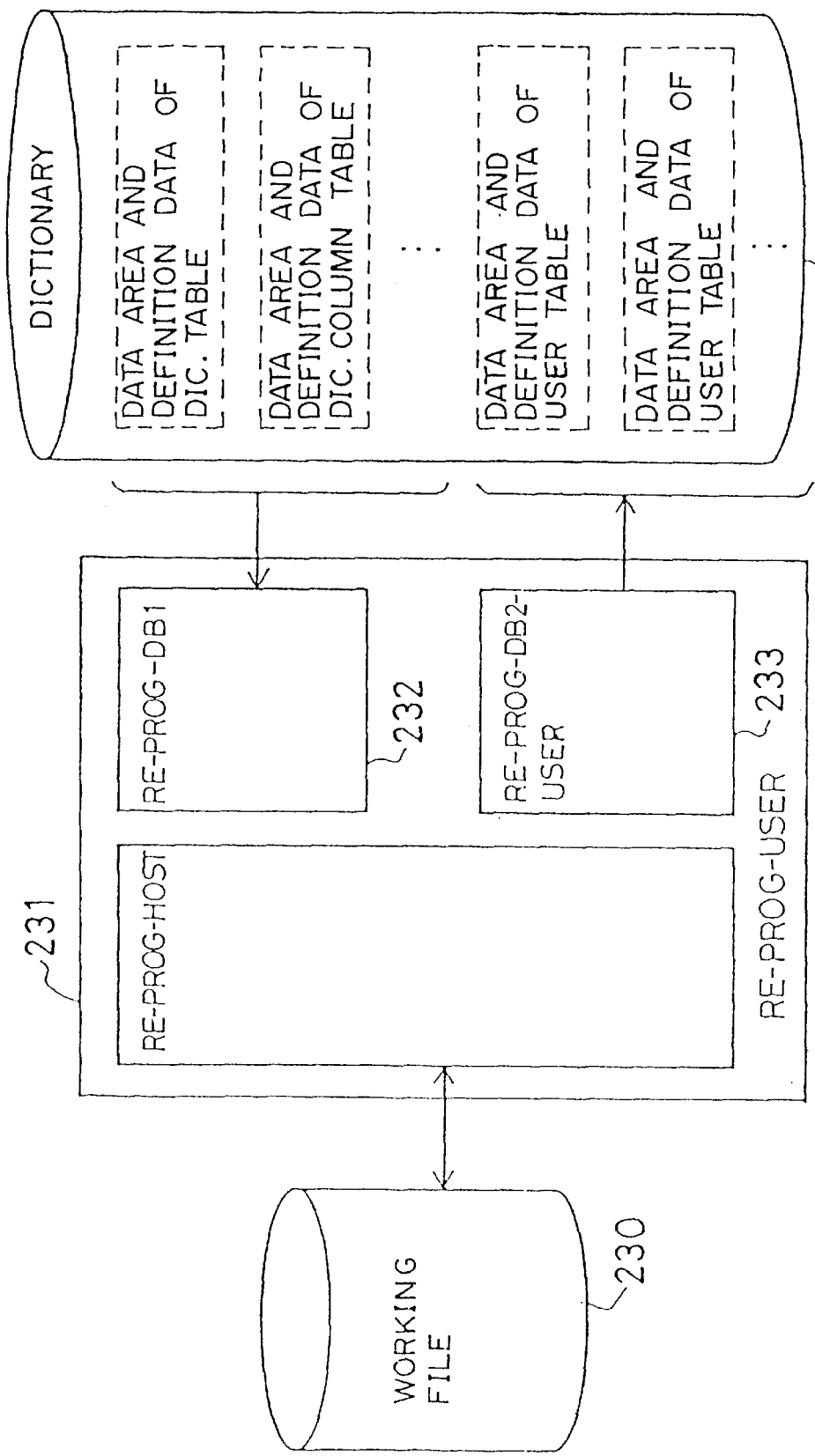
FIG. 24 is a block diagram for use in explanation of a reorganization process of definition data within a dictionary according to an embodiment of the present invention.

FIG. 24 is a diagram for use in explanation of a reorganization processing of dictionary definition data according to an embodiment of the present invention.

A new dictionary reorganization program (RE-PROG-USER) 231 shown in FIG. 24 retrieves definition data defining a new dictionary structure stored in the default dictionary structure in accordance with a dictionary data retrieval process (RE-PROG-DB1) 232 and stores the data in a working file 230.

Data storage space on the dictionary 234 is deleted, and data in the working file 230 is moved to a new dictionary structure by a dictionary data insertion process (RE-PROG-DB2-USER) 233.

In the process of accessing dictionary-structure dependent data, data stored in the default dictionary structure can be accessed by a dictionary data retrieval process (RE-PROG-DB1) 232 at the time of the distribution. The insertion of data into the new dictionary structure can be performed by the dictionary data insertion process (RE-PROG-DB2-USER) 233 which was generated at the time of the modifying of the system programs.

In addition, the dictionary structure can be modified by the above-described procedures in the implemented state as well. However, the user-defined table data added after the reorganization to the new dictionary structure must be moved on user's own responsibility.

As described above, according to the present invention, the modification of logical structures (table names, table structure, etc.) for managing database definition information in the place where a database management system has been installed and the modification of storage structures (data organization, storage key items, etc.) to conform to an amount of the database definition information and access forms are made possible.

In addition, there is no need for developing a special program for handling database definition information, whereby development efficiency is improved.

What is claimed is:

1. A method for developing a new database management system by using an existing database management system both of the existing database management system and the new database management system responding to requests in an identical query language, the existing database management system including a dictionary to store definition information of tables managed by the new database management system, an executable data definition program to update contents of the dictionary and an executable binding program to translate a source program described in the identical query language into an executable program by referring to the dictionary, said method comprising the steps of:

(a) defining dictionary information for the new database management system;

(b) storing a binding source program for a new executable binding program, including in the binding source program a reference to dictionary information described as an access to a dictionary table having a specified table name;

(c) storing the dictionary information in a definition data table of the existing database management system using the specified table name;

(d) translating the binding source program into a transitional executable binding program by execution of the executable binding program of the existing database management system;

(e) translating the binding source program into the new executable binding program of the new database management system by the transitional executable binding program;

(f) storing a definition source program for a new executable definition program;

(g) translating the definition source program into the executable definition program by the transitional executable binding program; and (h) setting up the new database management system with the dictionary information, the new executable binding program and the new executable definition program.

2. A method of developing a self-describing database management system, comprising the steps of:

(a) storing a data definition processing execution program of an existing database management system and definition data of a self-describing database management system to be developed in a database of the existing database management system;

(b) generating a first data definition processing execution program, which converts a data dictionary definition source into definition data to be utilized by the self-describing database management system to be developed and stores the definition data in a dictionary of the self-describing database management system to be developed using the existing database management system, by converting a data definition process source program using a first bind processing execution program;

(c) generating definition data having the structure of a dictionary of the self-describing database management system to be developed from definition data of the database management system to be developed using the first data definition processing execution program and storing the definition data generated in a dictionary of the self-describing database management system to be developed using the existing database management system;

(d) generating a second bind processing execution program for generating a program running on the self-describing database management system to be developed using the first bind processing execution program of the existing database management system in the dictionary of the self-describing database management system to be developed using the existing database management system, by referring to the definition data having the dictionary structure of the self-describing database management system to be developed;

(e) generating a third bind processing executing program for generating a program running on the self-describing database management system to be developed referring to the definition data having the dictionary structure of the self-describing database management system to be developed, by using the second bind processing execution program, referring to the definition data having the dictionary structure of the self-describing database management system to be developed on the dictionary using the existing database management system, and converting a bind processing source program;

(f) generating a second data definition processing execution program for generating definition data having the dictionary structure of the self-describing database management system to be developed on a dictionary of the self-describing database management system to be developed, by referring to the definition data having the dictionary structure of the self-describing database management system to be developed on the dictionary using the existing database management system, and using third bind processing execution program; and (g) generating the definition data on the dictionary of the self-describing database management system to be developed by converting the definition data having the dictionary structure of the self-describing database management system to be developed on the dictionary using the existing database management system.

* * * * *